United States Patent [19]
Kwoh et al.

[11] Patent Number: 6,115,057
[45] Date of Patent: *Sep. 5, 2000

[54] APPARATUS AND METHOD FOR ALLOWING RATING LEVEL CONTROL OF THE VIEWING OF A PROGRAM

[75] Inventors: Daniel S. Kwoh, La Canada/Flintridge; Roy J. Mankovitz, Encino, both of Calif.

[73] Assignee: Index Systems, Inc., Virgin Islands (Br.)

[ * ] Notice: This patent issued on a continued prosecution application filed under 37 CFR 1.53(d), and is subject to the twenty year patent term provisions of 35 U.S.C. 154(a)(2).

[21] Appl. No.: 08/918,547

[22] Filed: Aug. 22, 1997

Related U.S. Application Data

[63] Continuation-in-part of application No. 08/698,296, Aug. 15, 1996, which is a continuation of application No. 08/388,025, Feb. 14, 1995, abandoned.

[51] Int. Cl.$^7$ ........................................ H04N 7/00
[52] U.S. Cl. ............................ 348/5.5; 348/460
[58] Field of Search ................... 348/5.5, 7, 10, 348/734, 564, 563, 460, 12, 13, 1; 380/20; 455/3.1, 4.1, 4.2

[56] References Cited

U.S. PATENT DOCUMENTS

| | | | |
|---|---|---|---|
| 4,081,754 | 3/1978 | Jackson | 325/396 |
| 4,228,543 | 10/1980 | Jackson | 455/181 |
| 4,390,901 | 6/1983 | Keiser | 358/147 |
| 4,605,964 | 8/1986 | Chard | 348/460 |
| 4,718,107 | 1/1988 | Hayes | 455/4 |
| 4,768,229 | 8/1988 | Benjamin et al. | 348/1 |
| 4,888,796 | 12/1989 | Olivo, Jr. | 348/460 |
| 4,930,158 | 5/1990 | Vogel | 380/5 |
| 5,195,135 | 3/1993 | Palmer | 348/1 |
| 5,253,066 | 10/1993 | Vogel | 358/188 |
| 5,485,518 | 1/1996 | Hunter et al. | 380/20 |
| 5,548,345 | 8/1996 | Brian et al. | 348/734 |
| 5,550,575 | 8/1996 | West et al. | 348/5.5 |
| 5,583,576 | 12/1996 | Perlman et al. | 348/460 |
| 5,677,739 | 10/1997 | Kirkland | 348/468 |
| 5,757,335 | 5/1998 | Shintani | 348/5.5 |

FOREIGN PATENT DOCUMENTS

| | | |
|---|---|---|
| 4026399 | 2/1992 | Germany . |
| WO96/25821 | 8/1996 | WIPO . |

*Primary Examiner*—Victor R. Kostak
*Attorney, Agent, or Firm*—Christie, Parker & Hale, LLP

[57] ABSTRACT

An apparatus is provided for allowing rating level control of the viewing of a program. The apparatus includes a device for entering a desired rating level for controlling the viewing of a program, a device for extracting rating data from a program video segment, the rating data indicating a rating level of the program video segment, and a device for extracting text data representative of the content of the program video segment from the program video segment. The apparatus includes a device for determining whether the extracted rating data indicates that the program video segment has an acceptable rating level for viewing with regard to the entered desired rating level and a device for blocking the playing of the program video segment if it is determined that the extracted rating data indicates that the program video segment has an unacceptable rating level for viewing with regard to the entered desired rating level. The apparatus further includes a device for substituting display of the extracted text data representative of the content of the program video segment for the blocked program video segment, if it is determined that the extracted rating data indicates that the program video segment has an unacceptable rating level for viewing with regard to the entered desired rating level.

17 Claims, 24 Drawing Sheets

FIG. 7

```
PARENTAL CONTROL

THE FOLLOWING PROGRAMS ARE AVAILABLE FOR VIEWING

4:30pm – 5:00pm       4      CARTOON EXPRESS
                                 (23561)

5:00pm               11      L.A. LAKERS V. BOSTON
                                 CELTICS (0765)

6:30pm – 7:00pm      11      FAMILY TIES (15657)

7:00pm – 7:30pm       2      BEVERLY HILLBILLIES
                                 (49677)
```

FIG. 8

```
PARENTAL CONTROL

TO USE PARENTAL CONTROL FEATURE,

ENTER YOUR IDENTIFICATION (ID) NUMBER
```

FIG. 9

PARENTAL CONTROL

YOU HAVE ENTERED AN UNAUTHORIZED ID NUMBER PLEASE RE-ENTER YOUR ID NUMBER

FIG. 10

PARENTAL CONTROL

THE ID NUMBERS ENTERED ARE NOT AUTHORIZED ID NUMBERS. THE T.V. WILL NOW BE DISABLED FOR A PERIOD OF TIME.

FIG. 11

| PARENTAL CONTROL | |
|---|---|
| POSSIBLE SELECTIONS | TO MAKE SELECTION – PUSH |
| 1. ENABLED PROGRAMS | 1 |
| 2. BLOCKED PROGRAMS | 2 |
| 3. V BLOCK | 3 |
| 4. BLOCK CHANNEL | 4 |
| 5. REVIEW | 5 |
| 6. TO OVERRIDE FOR NORMAL T.V. VIEWING | 6 |
| 7. COMPARE FOR INCONSISTENCIES | 7 |

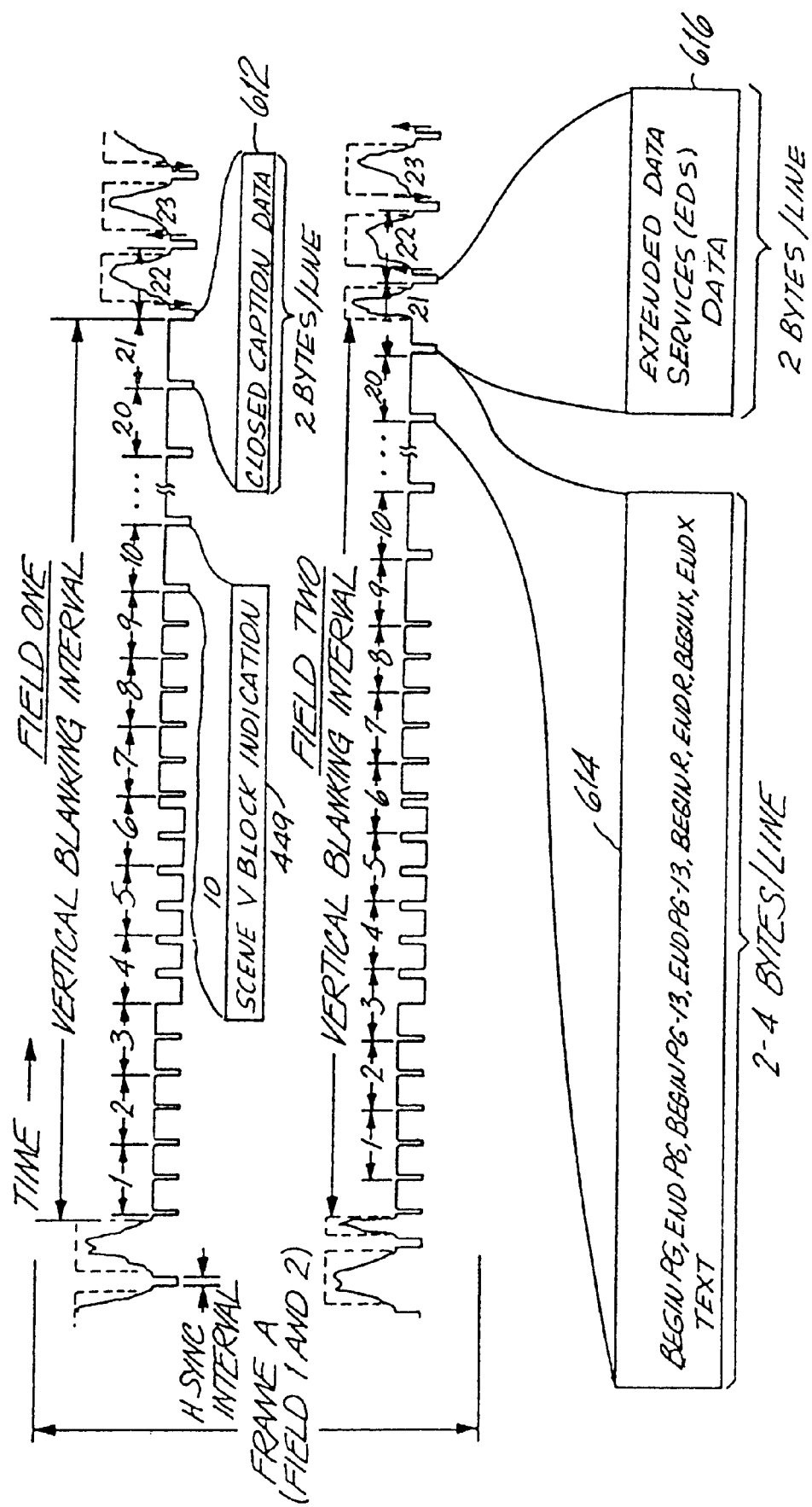

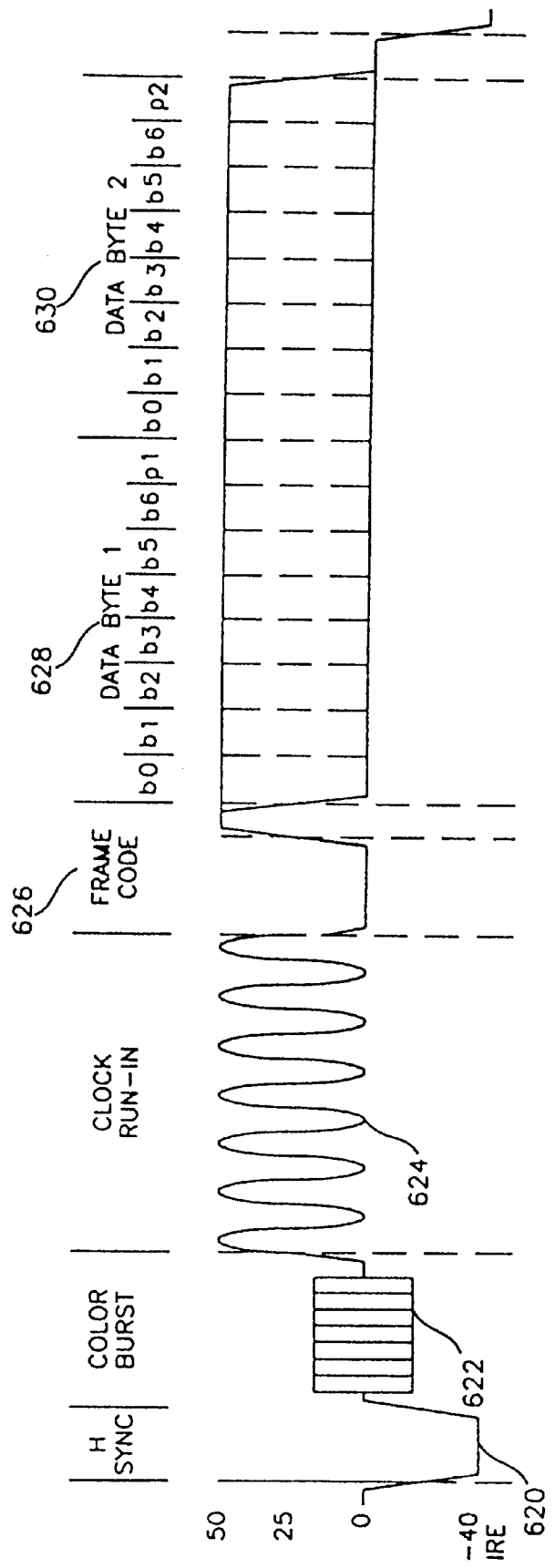

A AND B MEET ON THE STREET

A INSULTS B IN FRONT OF B's WIFE

A AND B FIGHT B DOES NOT SURVIVE

A IS ARRESTED AND TAKEN TO JAIL

APPARATUS AND METHOD FOR ALLOWING RATING LEVEL CONTROL OF THE VIEWING OF A PROGRAM

CROSS-REFERENCE TO RELATED APPLICATIONS

This application is a continuation-in-part of application Ser. No. 08/698,296 filed Aug. 15, 1996, which is a continuation of application Ser. No. 08/388,025 filed Feb. 14, 1995, now abandoned.

FIELD OF THE INVENTION

This invention relates generally to television and particularly to apparatus for providing parental control of television viewing.

DESCRIPTION OF THE RELATED ART

Parental control is presently available in some television receivers, video cassette recorders, and cable boxes on a limited basis. In these devices, certain channels may be locked out. However, the locking out of channels does not prevent children from spending excessive time watching television instead of studying or doing other things. Other devices limit the amount of time, but do not provide for selective viewing to prevent viewing of undesirable programs. One example of parental control at the television receiver is disclosed in U.S. Pat. No. 4,510,623 to Bonneau et al. A local oscillator for electronically tuning the television is controlled by a phase lock loop which is responsive to the output signal from a microprocessor. The microprocessor provides the output signal only if the selected channel has not been inhibited. To inhibit a channel for a period of time, the user enters a lockout code which is stored in a non-volatile memory. The memory provides one input to the microprocessor which is compared to the input by a user selecting a channel to be viewed. The microprocessor determines whether the selected channel is one of the inhibited channels and, if it is, does not generate the necessary signal for tuning to that channel.

Another prior art patent that discloses the blocking out of selected channels is U.S. Pat. No. 4,718,107 to John J. Hayes. The parental control disclosed in the Hayes patent is provided in a converter box. In this system, if the access code is forgotten, the converter box has to be taken to the business office of the CATV system to have the memory purged of the blocked-out channel information and the access code, and a new access code must be entered. In the Hayes device, only selected channels can be blocked which does not allow the selected blocking of particular programs in a channel.

In general, the present state of the art concerning parental control suffers from a number of drawbacks. In particular, the control is very limited and does not provide a parent the broad control desirable for controlling the viewing or use of a television by a child.

SUMMARY OF THE INVENTION

It is an object of this invention to provide a television receiver that allows a parent to control the viewing of programs.

It is another object of this invention to allow a parent to select a rating level that will be displayed on a television to youngsters. For example, the parent can specify a PG (parental guidance) rating as a desired rating level. Then any program video segments with a rating of PG-13, R, or X will be blocked from viewing; however, PG and G program video segments will be displayed.

It is another object to substitute the display of text describing what is happening in the plot for the blocked program video segment.

In accordance with an embodiment of the invention, an apparatus is provided for allowing rating level control of the viewing of a program. The apparatus includes a device for entering a desired rating level for controlling the viewing of a program, a device for extracting rating data from a program video segment, the rating data indicating a rating level of the program video segment, and a device for extracting text data representative of the content of the program video segment from the program video segment. The apparatus includes a device for determining whether the extracted rating data indicates that the program video segment has an acceptable rating level for viewing with regard to the entered desired rating level and a device for blocking playing of the program video segment if it is determined that the extracted rating data indicates that the program video segment has an unacceptable rating level for viewing with regard to the entered desired rating level. The apparatus further includes a device for substituting the display of the extracted text data representative of the content of the program video segment for the blocked program video segment.

Other objects and many of the attendant features of this invention will be more readily appreciated as the same becomes better understood by reference to the following detailed descriptions and considered in connection with the accompanying drawings in which like reference symbols designate like parts throughout the figures.

BRIEF DESCRIPTION OF THE DRAWINGS

FIGS. 7–11 illustrate the different displays on the screen of the TV or the display of the VCR or remote controller employing the present invention;

FIG. 21 is a timing diagram showing the vertical blanking interval (VBI) lines of field 1 and field 2;

FIG. 22a is a timing diagram of the standard data format (1X) for transmitting data in the VBI;

DETAILED DESCRIPTION OF THE SPECIFIC EMBODIMENTS

Figure 1:
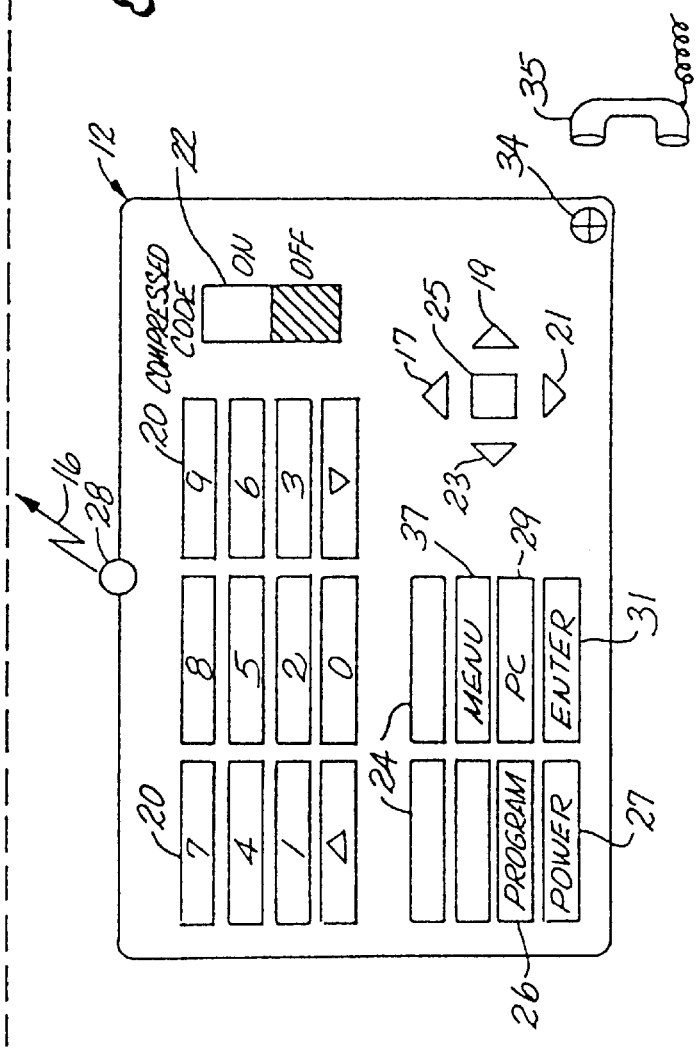
FIG. 1 is a schematic showing apparatus including a parental control device that receives the signal source input and blocks or enables programs and attaches to a cable box according to the present invention. A remote controller is included for controlling the parental control device.
Figure 2:
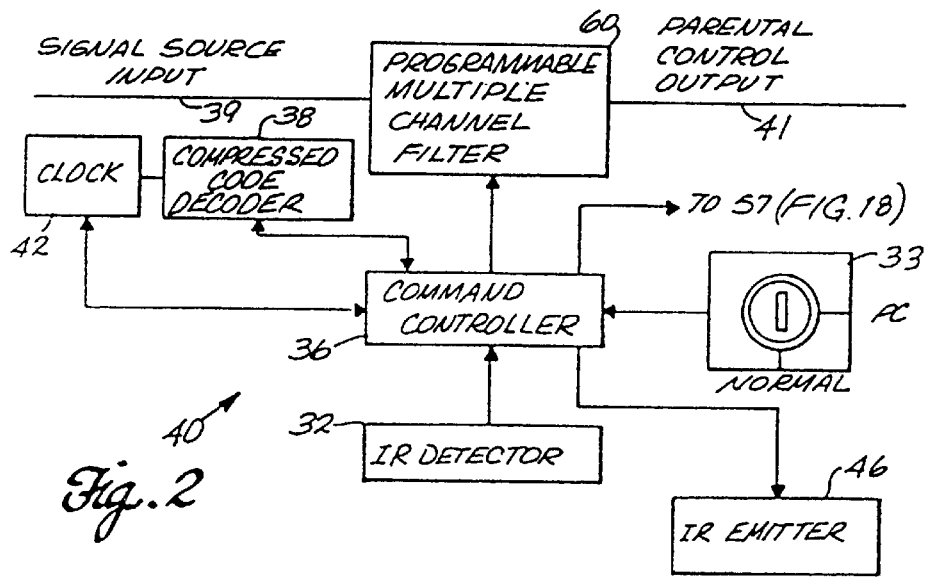
FIG. 2 is a schematic showing the details of a parental control device having a programmable multichannel filter according to the present invention.
Figure 18:
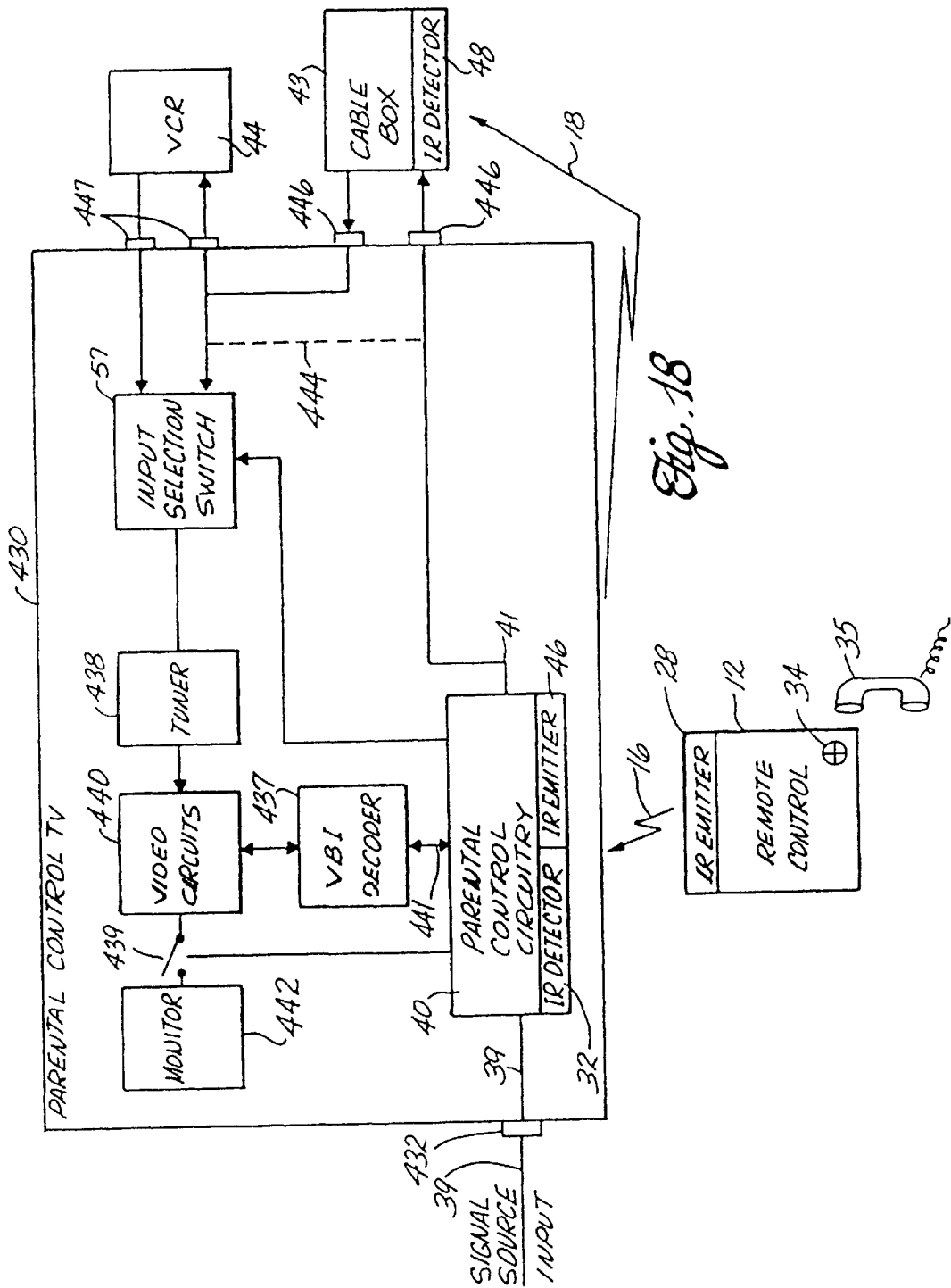
FIG. 18 is a schematic showing a television receiver including a parental control device that receives the signal source input and blocks or enables program according to the present invention.

Referring to the drawings, parental control circuity 40 is shown in FIG. 1 for providing parental control of the use of a television receiver. The parental control circuitry 40 is directly connected to the signal source input line 39 which is attached to parental control circuitry 40 through the tamper proof connector 50. The signal source input line 39 may be from one of many typical sources such as an antenna, television cable, or a satellite converter box. The signal source input line 39 is locked to the parental control circuitry 40 by the tamper proof connector 50 so that the parental control circuitry 40 may not be easily removed from the system and simply bypassed. The output of the parental control circuitry 40 is sent to cable box 43, which converts channels for use by the VCR 44 and the television monitor 45. The cable 41 between the parental control circuitry 40 and the cable box 43 may also have tamper proof connecters on either end, such as tamper proof connector 52 and tamper proof connector 54. The purpose of the parental control circuitry 40 is to allow parents to either enable selected programs for viewing, or to block selected programs. Locating the parental control circuitry 40 between the signal source input line 39 and the cable box 43 allows the enabling or blocking of programs that are purposely scrambled and intended to be unscrambled by the cable box 43. The parental control circuity 40 can be commanded via control keys on the parental control circuitry 40 (not shown) or the remote controller 12, which is further described below. To communicate with the remote controller 12, the parental control circuitry 40 has an infrared detector 32. The parental control circuitry 40 also has an infrared emitter 46 which can communicate with infrared detector 48 in the cable box 43. For example, if parental control circuitry 40 is tuned to a particular channel associated with a selected program, then the parental control circuitry 40 can communicate via infrared emitter 46 to switch cable box 43 to the same channel via infrared detector 48. The output of cable box 43 is typically channel 3 or channel 4, and the VCR 44 and the television monitor 45 are typically tuned to the output channel of the cable box 43. FIG. 2 is a specific embodiment of parental control circuitry 40. In this embodiment, signal source input on line 39 is passed through programmable multiple channel filter 60 to form the parental control output on line 41. Programmable multiple channel filter 60 is controlled by command controller 36. The command controller 36 receives commands from infrared detector 32 and outputs commands to cable box 43 via infrared emitter 46. Command controller 36 is coupled to/from the clock 42 and the compressed code decoder 38, which also has an input from the clock 42. The clock 42 in parental control circuitry 40 can be synchronized with a clock in VCR 44 and any other clocks in the parental control system 11 by downloading time encoded as audio tones from telephone 35 to microphone 34 and remote controller 12, which can then send the time to the various clocks in the system to synchronize them. The command controller also receives an input from key switch 33, which has a parental control (PC) position and a normal position. The key for key switch 33 should be kept by the parent in a secure place. If the key switch is in the normal position then any program can be watched. If the key is in the PC position, then only programs that are enabled can be watched. Outputs from command controller 36 may include input selection switch 57 and vertical blanking interval decoder 437, as shown in FIG. 18, when the parental control circuitry is also connected to devices other than the cable loop. For example, the parental control circuitry 40 may be located inside the television as shown in FIG. 18 or outside the television and somewhere before the input to the television.

Figure 5:
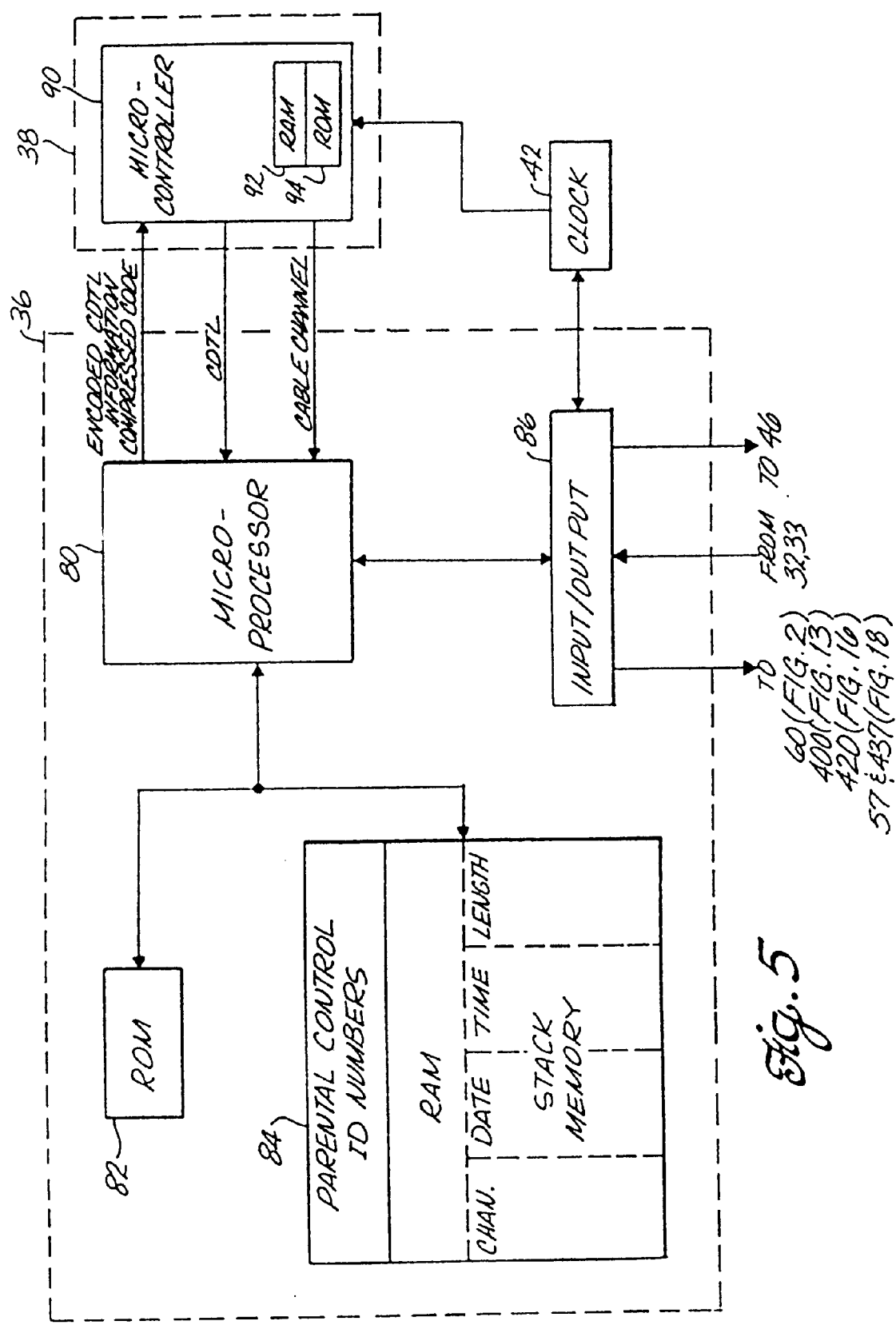
FIG. 5 is a schematic of a processor for implementing the command controller and compressed code decoder according to the present invention.

The command controller 36 and compressed code decoder 38 can be implemented as shown in FIG. 5 and are described in further detail below. However, before the details of FIG. 5 are described, the programmable multiple channel filter 60 of FIG. 2 and its operation are described.

Figure 3:
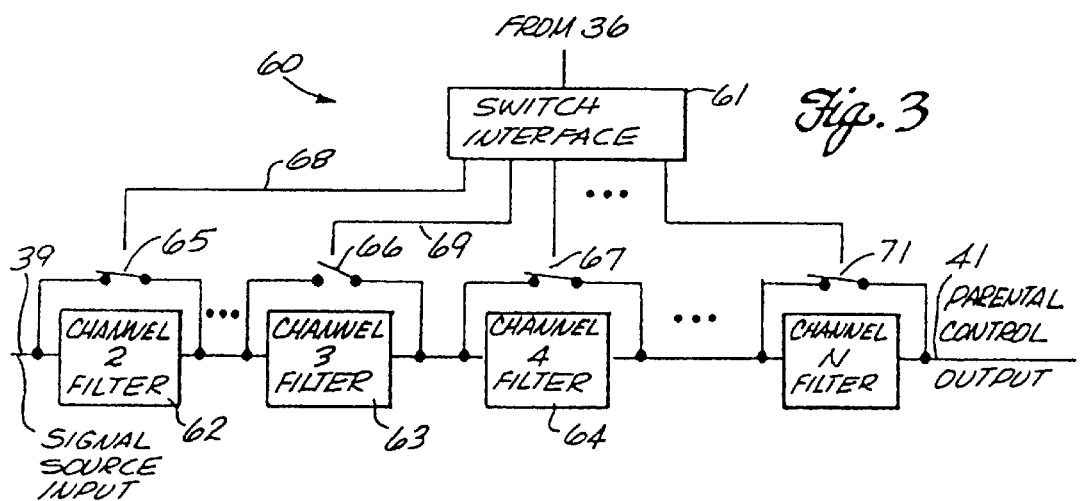
FIG. 3 is a schematic showing a programmable multiple channel filter according to the present invention.

The programmable multiple channel filter 60 can be implemented as shown in FIG. 3. Suppose a user has specified a number of programs to be blocked from viewing on the television 45. The user can specify which programs to block by either specifying particular programs to be blocked, or by specifying that all programs on a particular channel be blocked. FIG. 3 shows a programmable multiple channel filter 60 which can filter multiple channels from the broad band television signal input 39. For example, in FIG.

3, switch 66 is shown as open which indicates that the channel 3 filter 63 will filter channel 3 from the parental control output 41. On the other hand, switch 65 and switch 67 are closed allowing the broad band television signal input 39 to bypass channel 2 filter 62 and channel 4 filter 64. Thus, channels 2 and 4 are not filtered from the parental control output 41. Switches 65–71 are controlled by switch interface 61 which is in turn controlled by command controller 36. If a particular program is to be blocked from viewing, then the command controller 36 opens the appropriate switch, for example, switch 66 for channel 3, at the start of the program and closes the switch 66 at the end of the program. This would block the viewing of that particular program on channel 3. To perform this function, the command controller needs to know the channel, date, time-of-day and length (CDTL) of the program to be blocked from viewing. This CDTL information can be either input as channel, date, time-of-day and length to the parental control circuitry 40 or can be entered via compressed codes, which are described below, via remote controller 12.

Another method of determining when to block a program is to look for a program identifier in the signal received from the television signal source. If the received program identifier matches the program identifier of a program to be blocked that has been entered in the command controller 36, then the program is blocked. An example of this method is called VPS, which is a program identification transmitted with the television signal in European broadcasting systems. This technique can also be used to enable programs.

Figure 4:
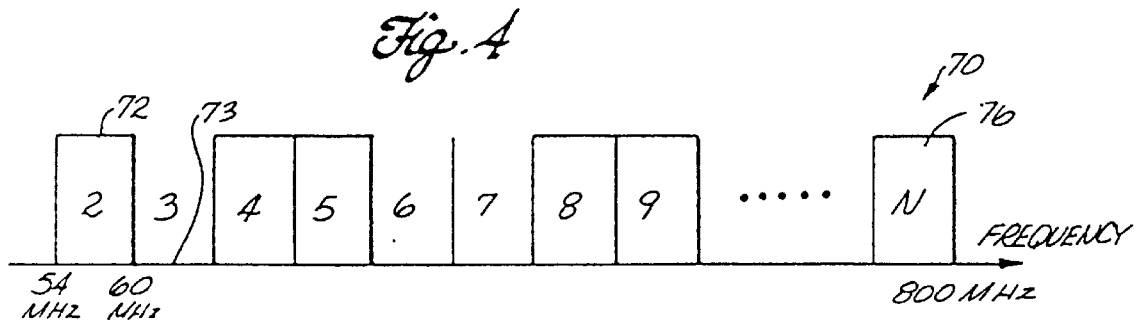
FIG. 4 is an illustration of a frequency spectrum showing channels being blocked according to the present invention.

FIG. 4 shows an example frequency spectrum for a broad band television signal that has been filtered by programmable multiple channel filter 60. In FIG. 4 channels 3, 6, and 7 have been filtered so that programs in those channels cannot be viewed. Because it is possible with the programmable multiple channel filter 60 to either block the viewing of an entire channel or a particular program, the frequency spectrum of the parental control output 41 will change over time as the command controller 36 sends commands for turning on and off the switches 65–71 to the switch interface 61.

The remote controller 12, shown in FIG. 1 has a number of keys, which include numerical keys 20, compressed code switch 22, function keys 24, program key 26, and power key 27. The remote controller 12 also includes a total parental control key 29 and an enter key 31. The remote controller may further advantageously include a cursor control having up/down keys 17 and 21, respectively, right/left keys 19 and 23, respectively, and an activate key 25. There are means in the remote controller 12 that interpret each key as it is pressed, and sends the proper command signal 16 to the parental control circuity 40 via the infrared diode 28. Except for the compressed code switch 22, the total parental control key 29, menu key 37, enter key 31 and the up/down 17/21, right/left 19/23 and activate 25 keys, the remote controller is essentially the same as any other remote controller in function. It is to be noted that the typical keys of remote controllers, such as volume control and channel selection, are not shown on the controller of FIG. 1, but would ordinarily be present.

The total parental control key 29 and enter key 31 are used when selecting programs that are to be blocked or enabled for viewing on the television. The enter key 31 is used when entering the user's identification code that permits programming of the parental control circuitry to set up the programs to be blocked or enabled for viewing on the television receiver.

The compressed code switch 22 is provided to allow the user to lock the remote controller 12 in the compressed code mode while using a compressed code, which is encoded CDTL information. The compressed codes allow easy selection of a program to be enabled or blocked under parental control.

The remote controller 12 also can have a microphone 34, which can be used together with telephone 35, to download encoded CDTL information or compressed codes as well as other information such as time and IR codes for the particular devices. The compressed codes for programs that are to be enabled for viewing or blocked from viewing are entered via audio tones from telephone 35. In one embodiment, the compressed codes or program identifiers from a preselected list of violent programs are downloaded via telephone from a central data base. The parent calls the data base and then holds the television receiver 35, near the remote controller microphone 34. The received compressed codes are then communicated from the remote controller 12 to command controller 36.

Alternatively, the violent program may be coded and a printed television guide and the parent may enter the compressed code for the selected programs by using the keypad of the remote 12.

A possible realization of the command controller 36 and the compressed code decoder 38 is shown in FIG. 5. The command controller 36 includes a microprocessor 80 for overall control and for performing the parental control functions, a read only memory 82 for program storage, a random access memory (RAM) 84, and input/output circuitry 86. This input/output circuitry 86 is adapted to receive commands from the infrared detector 32 and the key switch 33. The input/output has output interfaces to infrared emitter 46, and, when appropriate, to input selection switch 57 and vertical blanking interval decoder 437, the latter two of which are shown in FIG. 18. The input/output circuitry 86 has a bidirectional interface to clock 42. Commands are sent from command controller 36 via input/output 86 to the programmable multiple channel filter 60, shown in FIG. 2, the tunable channel jammer 400, shown in FIG. 12, and the tunable channel selector 420, shown in FIG. 15. The random access memory 84 includes a section for the parental control identification code and a section of stack memory for storing the channels, dates, times-of-day, and lengths for programs selected to be enabled for viewing or, alternatively in the case of exclusion, the channels, dates, times-of-day, and lengths for programs selected to be blocked from viewing. Either the ID number section, or the stack memory may be separate from RAM 84. As noted above, the compressed code, which are encoded CDTL information, may be advantageously used to simplify the parental control operation of the television.

One implementation of the compressed code decoder 38 is shown in FIG. 5. A microcontroller 90 with a random access memory 92 and a read only memory 94 has interfaces to microprocessor 80. The encoded CDTL is sent to microcontroller 90, which decodes the compressed code and returns CDTL information to microprocessor 80.

In order for the compressed code to be useful, it must be decoded, and apparatus for that purpose must be provided. A compressed code decoder 38 is included in the parental control circuitry 40 of FIG. 1 and is further shown in FIGS. 2, 13, and 16. If the command controller 36 determines that a compressed code has been received, then the compressed code will be sent to the compressed code decoder 38 for decoding. The compressed code decoder 38 converts the compressed code into channel, date, time and length (CDTL) information which is stored in RAM 84 and used by the command controller 36 to control the enabling and clocking of particular programs.

U.S. Pat. No. 5,335,079 issued Aug. 2, 1994 describes apparatus and methods for compressed code encoding and decoding and is incorporated herein by reference as though set forth in full.

As described in U.S. Pat. No. 5,335,079 the compressed code encoding and decoding can be made a function of the time read from the clock 42. This makes it very difficult for the key and therefore the coding technique to be duplicated or copied. It is also possible to have the decoding and encoding techniques dependent on any other predetermined or preprogrammable algorithm.

The clock 42 is also used for the timing of the operation of the command controller 36. When the proper date and time-of-day is read from clock 42, then the command controller 36 controls the parental control circuitry 40 to block or enable programs going to the cable box 43.

Figure 6:
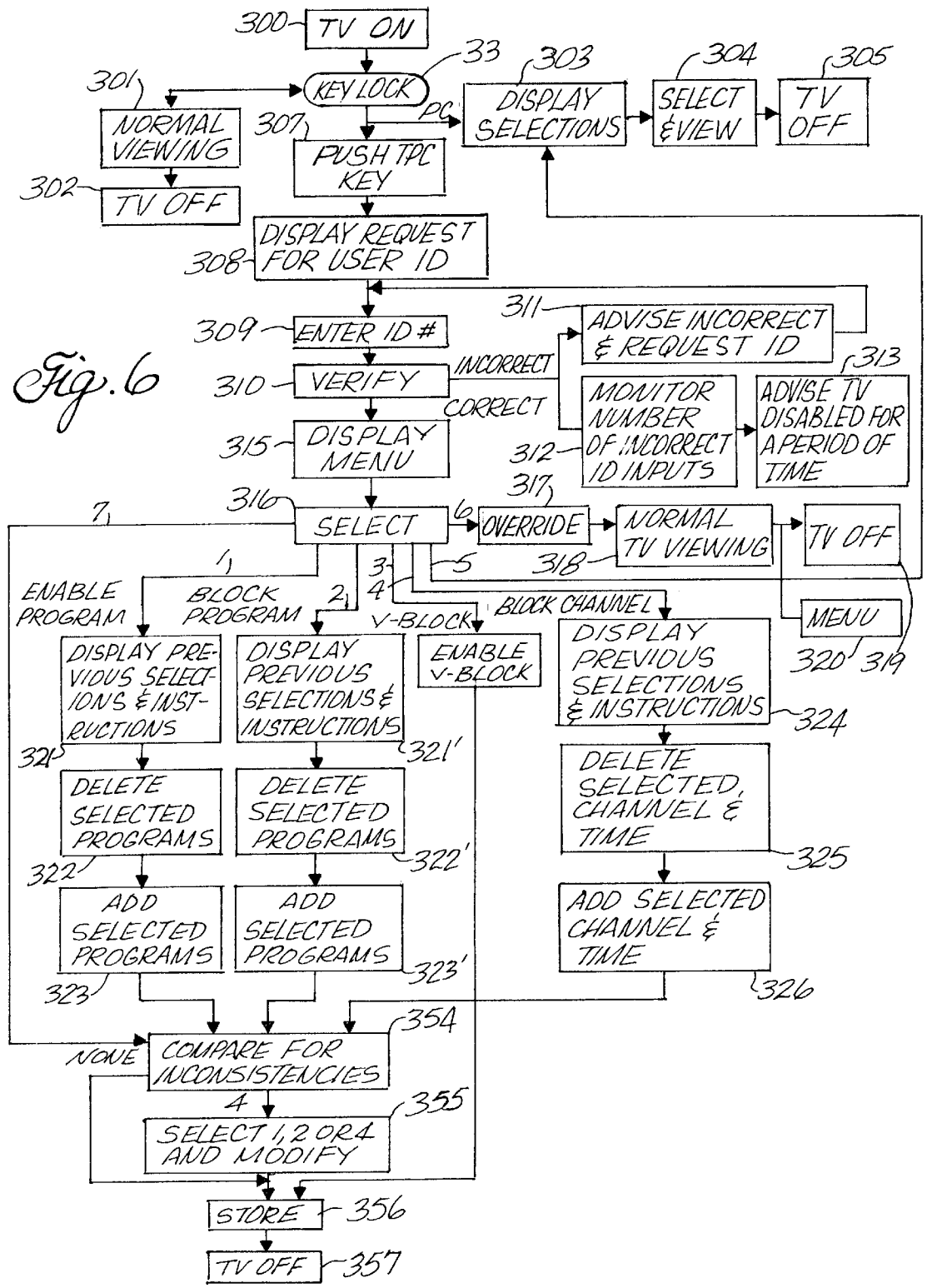
FIG. 6 is a flow-chart of the operation of apparatus incorporating the parental control device in accordance with the present invention.

The operation of the parental control device 40 of FIG. 1 may be better understood by reference to the flow chart set forth in FIG. 6. The TV is turned on at step 300, and any other ancillary apparatus, such as parental control circuitry 40 in FIG. 1, is also turned on. If the key lock 33 is in the position for normal TV viewing, then the normal viewing of step 301 will be available. After completion of viewing, the TV is shut off (step 302). If the key lock 33 is in the parental control position, then upon turning on the TV, the selections that are enabled or blocked for viewing will be displayed on the screen as shown in step 303. A representative display of programs to be enabled in step 303 is shown in FIG. 7. A similar display is used to display blocked programs. The user of the apparatus may then select one of the programs that is enabled for viewing in step 304 and, upon completion of viewing, the TV is then shut off in step 305. If the programs to be blocked or enabled are to be modified, then the total parental control key, such as key 29 in FIG. 1, is pushed in step 307.

The pushing of the total parental control key 29 will cause a message to appear on the screen of the TV such as the one shown in FIG. 8 wherein the user is requested to enter his or her identification (ID) code or number. Following the display of the message in step 308, the user enters his or her ID in step 309 by using the numbers of the key pad 20, for example, as shown in the remote controller of FIG. 1. The authorized user ID codes will have been previously stored in the parental control ID section of the RAM 84, as illustrated in FIG. 3. A typical user ID might be 6823 which, when entered, is compared in the verify step 310 under the control of the microprocessor 80 with the authorized parental control IDs stored in the RAM 84. The ID code number is entered by pressing keys numbered 6, 8, 2 and 3 and then the enter key 31. If the ID number that is entered is not an authorized number stored in RAM 84, then the user will be advised in step 311 by a message, such as the message of FIG. 9, displayed on the TV screen that the ID number is incorrect and the entry of another ID number will be requested. Steps 309 and 310 will, again, take place upon the entry of the new ID number and, if this ID number is again incorrect, the user will again be advised in step 311. Upon the entry of a number of incorrect ID numbers, such as 3, which are monitored in step 312, then the user will be advised in step 313 by a message such as the one shown in FIG. 10 that the ID numbers that have been entered are not authorized ID numbers and that the TV will be disabled for a period of time. The period of time may, for example, be 30 minutes or one hour or whatever may be selected during set up by the authorized user of the equipment.

If in the verification step 310 the user ID code that has been entered is an authorized ID, then in step 315 a menu will be displayed on the TV screen, such as shown in FIG. 11. The menu displayed in step 315 as shown in FIG. 11 has choices for enabling programs, blocking programs, and enabling V-block, which is a choice that allows the blocking of scenes in programs or entire programs that have objectionable violence, nudity, or language. One or more of the possible selections set forth in the menu of FIG. 11 may be selected in step 316. The user may also select entry 6 on the menu to override the parental control operation by pushing number 6 on, for example, the remote controller 12 of FIG. 1, for normal TV viewing. This will cause the override of step 317 to permit normal TV viewing (step 318) after which the TV will be shut off in step 319 or the menu of FIG. 11 may again be displayed in step 320 by pushing the MENU key 37 shown in FIG. 1.

With the menu displayed on the screen of the television in step 315 or 320, the user need only push one of the numbered keys on key pad 20 to set up the mode for selecting one of the possible selections as shown in the menu of FIG. 11. The pushing of button 1 will permit the selection of programs to be enabled, as illustrated in FIG. 7. Upon pushing button key 1, for example, (step 321), the previous selections that have been made will be displayed along with instructions for making deletions or additional selections.

If programs are to be deleted in step 322, the user activates the cursor by pressing button 25 (FIG. 1), and then moves the cursor on the TV screen displaying the available programs, e.g., as shown in FIG. 7, by use of the up/down keys 17 and 21 and the right/left keys 19 and 23 to the program that is to be deleted. With the cursor highlighting the program to be deleted, the enter key 31 is depressed to complete the deletion of the program from programs that may be viewed. In step 322, programs may, alternatively, be deleted by entering a compressed code for a program, as shown in FIG. 7. For example, if it is desired to delete the program FAMILY TIES, it is only necessary to enter on the keypad 20 the numbers "1-5-6-5-7" and thereafter press the ENTER key 31. This will complete the deletion of FAMILY TIES from the programs available for viewing.

Figure 19:
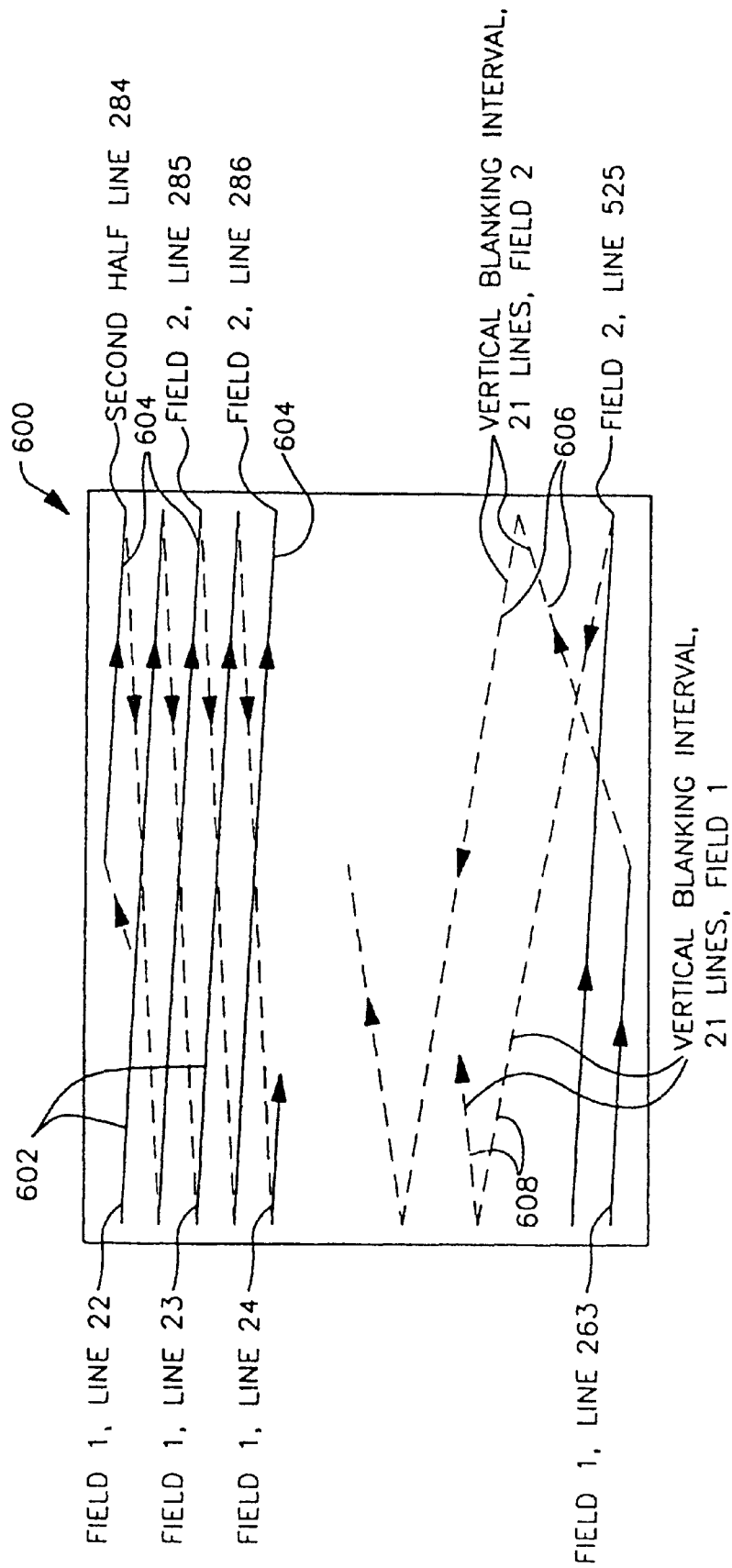
FIG. 19 is a schematic diagram illustrating an interlaced raster scanning pattern of a conventional television.

Similarly, to add one or more programs for viewing in step 323, the compressed codes that appear with the programs listed in the printed TV schedules may advantageously be employed. The user, on deciding which of the programs listed in the TV schedule to make available for viewing, enters the compressed code for each of these programs by using the keypad 20 on the apparatus or on the remote controller, as shown in FIG. 1, and the enter key 31. The TV schedule may also be made available on a floppy disk, as disclosed in U.S. patent application Ser. No. 07/882, 291 filed May 13, 1992 and incorporated herein by this reference as though set forth in full. A floppy disk drive may be incorporated into the parental control circuitry, the VCR, or the television for reading the TV schedule and displaying same on the screen of the TV. If a floppy disk is used, then programs to be added may be selected by use of the cursor keys shown in FIG. 1 or by entry of the compressed code that is listed in the TV schedule retrieved from the floppy disk. Additionally, the TV schedule may be available as part of the TV broadcast signal in the vertical blanking interval of the TV signal or as the video program. When the vertical blanking interval is used to carry the TV scheduling information, the schedule information may be retrieved from the TV broadcast signal by a vertical blanking interval decoder 437, as shown in FIGS. 18 and 19 and displayed on the TV monitor 442 of FIGS. 18 and 19, for example. Again, the programs to be added may be selected by use of the cursor keys as shown in FIG. 1, or by entry of the compressed code as described above.

The user may also select programs to be blocked from viewing on the TV by pushing button 2 when the menu is being displayed on the TV screen in step 315. Steps 321', 322', and 323' operate in an analogous manner to steps 321, 322, and 323.

The V-block mode may be selected by pushing button 3 when the menu is being displayed on the TV screen in step 316. The V-block mode enables the automatic blocking of programs or scenes in programs that have objectionable violence, nudity, or language. The V-block operation is described further below.

During the selection process, each selection to be added is stored in RAM 84 and at the completion of the selection process transferred to the stack memory portions of RAM 84 for storage in temporal order. Upon the completion of each selection from the menu, the menu key 37 is depressed to return to step 315 for display of the menu shown in FIG. 11. At any time in the selection process, the key 7 may be depressed while the menu is being displayed to compare the selections that have been made for possible inconsistencies, which is done in step 354. For example, if programs have been both enabled and blocked this will be noted as an inconsistency. If there are no inconsistencies, then the microprocessor 80 causes the selections to be stored in step 356 in the stack memory portion of the RAM 84. If inconsistencies do exist in step 354, then the program, channel, date, or time that is to be deleted to avoid the inconsistency is selected in step 355 by depressing the appropriate key 1, 2 or 4 and going through the delete step 322 or 322'. Once there are no inconsistencies in the selections and the selections are stored in the stack memory portion of RAM 84, then the TV is shut off in step 357.

Figure 12:
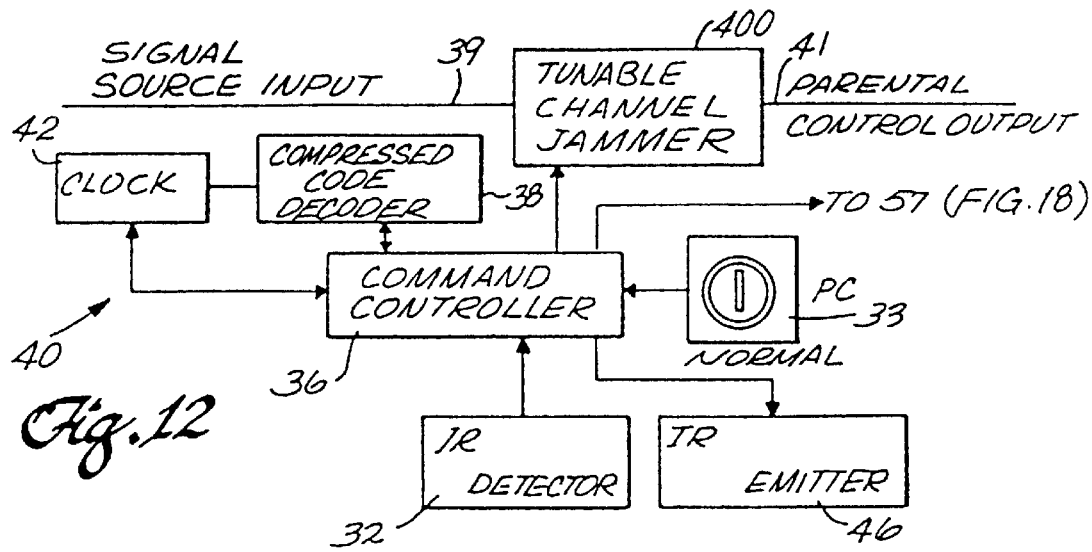
FIG. 12 is a schematic showing the details of a parental control device having a tunable channel jammer according to the present invention.

Another specific embodiment of the parental control circuitry 40 is shown in FIG. 12. Most of the elements of FIG. 12 are the same as those shown in FIG. 2 so an explanation of those will not be repeated. However, a key difference is tunable channel jammer 400 which is imposed between signal source input line 39 and parental control output line 41. The purpose of tunable channel jammer 400 is to block the viewing of particular channels, or programs. Implementing the programmable multiple channel filter of FIG. 3 might be fairly expensive, because each channel filter would have to be fairly precise in order to not interfere with adjacent channels and the number of components involved would result in a high cost. Rather than filtering a channel as in FIG. 3, tunable channel jammer 400 instead has the purpose of jamming a channel or multiple channels. If a channel is selected to be blocked from viewing, then the jamming on that channel can be continuous. If particular programs have been selected to be blocked from viewing, then the respective channels for those programs will be jammed on that date starting with the time of day for that program and end after the program has ended. The start and end time for the programs can be attained from the CDTL information in the G codes.

Figure 13:
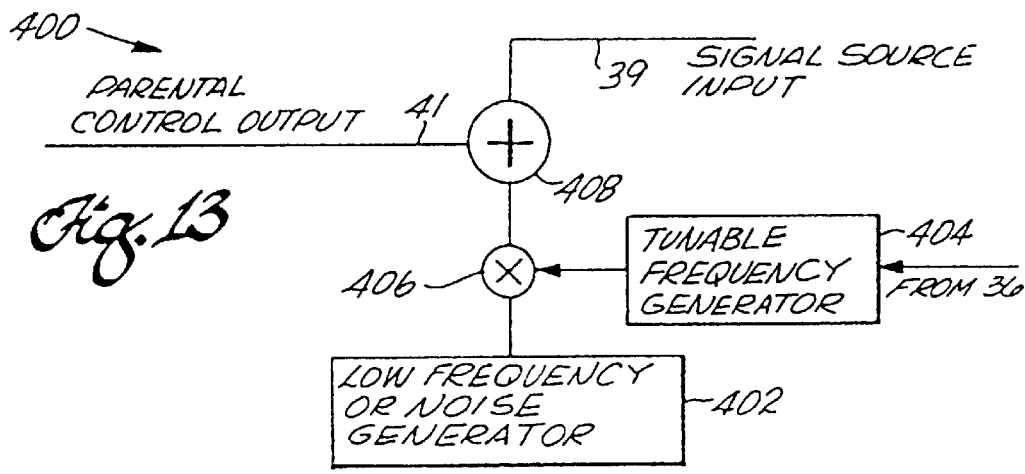
FIG. 13 is a schematic of a jammer according to the present invention.

FIG. 13 shows an apparatus for implementing tunable channel jammer 400. One implementation, a narrow band noise source 402 is mixed with a tunable frequency generator 404 in mixer 406 and then combined with signal source input line 39 in combiner 408 to produce the parental control output on line 41. The tunable frequency generator 404 would be tuned to place the narrow band noise inside the channel to be jammed. Multiple channels can be jammed by time sharing the circuity of FIG. 13. For example, if channels, 2, 3, 5, and 10 are to be jammed at the same time then the tunable frequency generator 404 would be tuned to each of those channels for a set period of time and then would skip to the next channel to be jammed and so on. If the duty cycle of the jamming on any particular channel is high enough, then the channel will be unwatchable. By time sharing the apparatus in this manner considerable costs can be saved.

Figure 14:
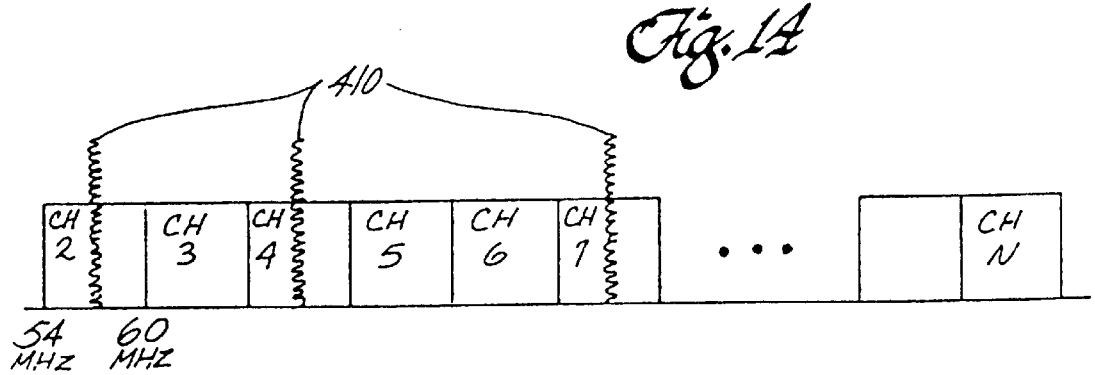
FIG. 14 is an illustration of a frequency spectrum showing channels being jammed according to the present invention.

In another implementation, instead of having a narrow band noise source 402, a low frequency generator 402 is supplied. Again, tunable frequency generator 404 is used to place the low frequency within the channel to be jammed. Tests have shown that a noise generator with a 1 kilohertz bandwidth centered at 55 megahertz is sufficient to block the viewing of channel 2. The circuity of FIG. 13 may be time shared between as many as 10 channels at a time which results in a 10 percent jamming duty cycle on any particular channel. FIG. 14 is an illustration of a frequency spectrum showing jamming occurring in channels 2, 4, and 7.

Figure 15:
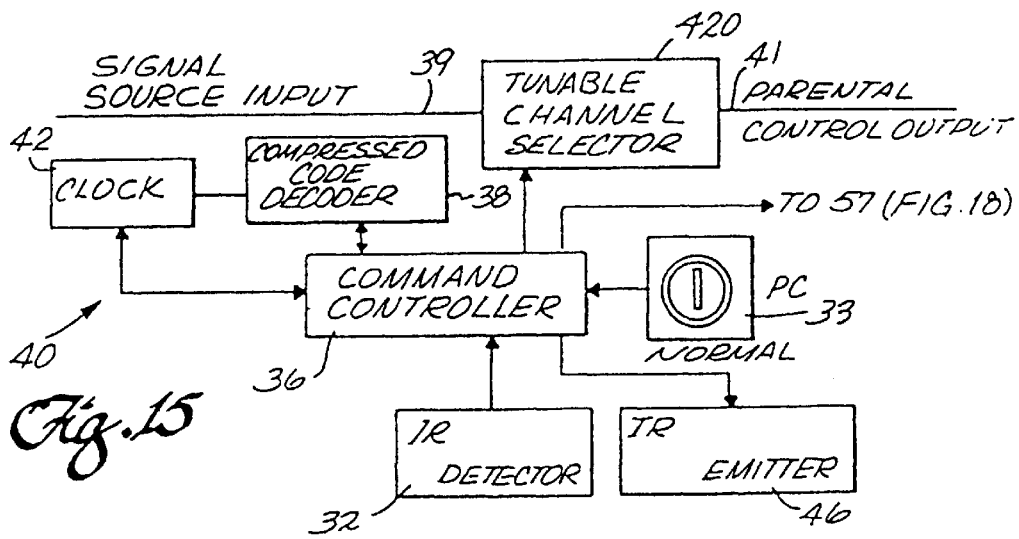
FIG. 15 is a schematic showing the details of a parental control device having a tunable channel selector according to the present invention.

The programmable multiple channel filter 60 of FIG. 2 and the tunable channel jammer 400 of FIG. 12 both have the purpose of blocking a channel or a program from viewing by a user of a television. FIG. 15 is a specific implementation of parental control circuitry 40 which allows particular channels or programs to be enabled for viewing on a television. Again, most of the elements of FIG. 15 are similar to those in FIG. 2, however, tunable channel selector 420 is different and has the purpose of enabling certain channels or programs for viewing.

Figure 16:
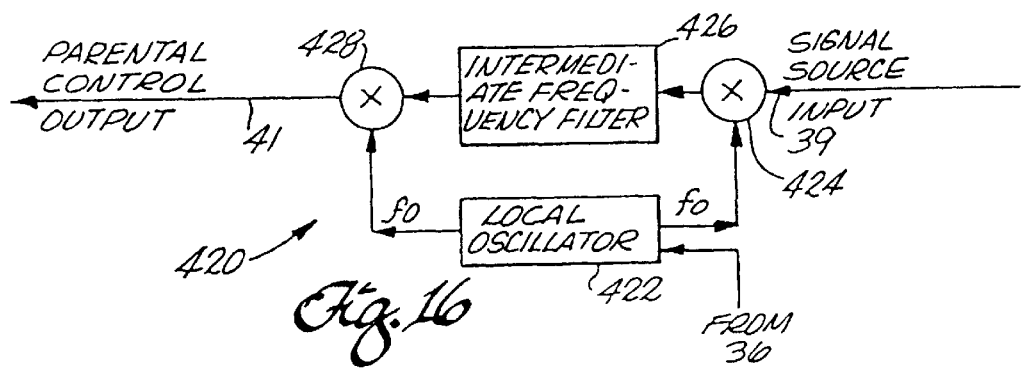
FIG. 16 is a schematic of a tunable channel selector according to the present invention.

FIG. 16 shows an implementation of tunable channel selector 420. In FIG. 16, the signal on signal source input line 39 is frequency down converted by mixing this signal with the output of tunable local oscillator 422 in frequency down-converter 424. The output of frequency down-converter 424 is then filtered by intermediate frequency filter 426 to pass only the channel to be enabled for viewing. This channel is then frequency up converted by frequency up-converter 428, which mixes the output of intermediate frequency filter 426 with the output of tunable local oscillator 422. The amount of frequency down conversion in frequency down-converter 424 is equal to the amount of frequency up conversion in frequency up-converter 428. The tunable local oscillator 422 is the same for frequency down-converter 424 and frequency up-converter 428.

Figure 17:
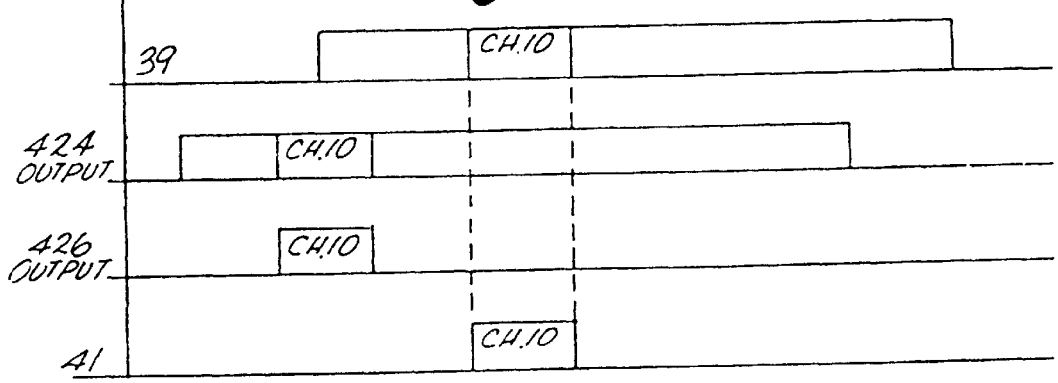
FIG. 17 is an illustration of the frequency spectrum at various locations in FIG. 16.

FIG. 17 illustrates the frequency spectrum at signal source input line 39, the frequency down-converter 424 output, the intermediate frequency filter 426 output, and the output on parental control output line 41 of FIG. 16. As shown in FIG. 17, the result is that on parental control output line 41 only the selected channel is remaining which is channel 10 in FIG. 17. Since at any one time only one channel is enabled for viewing, the command controller 36 must command the cable box 43 to tune itself to the proper channel. This is done by communicating through infrared emitter 46 to infrared detector 48 on cable box 43.

A parental control television 430 is shown in FIG. 18. The parental control television 430 has parental control circuitry 40 incorporated into it. The parental control circuitry 40 inside the parental control television 430 can be implemented as previously discussed to either block certain programs and channels from viewing or enable certain programs and channels for viewing. Specifically, parental control circuitry 40 can be implemented as shown in FIG. 2, FIG. 12, or FIG. 15. By incorporating the parental control circuitry 40 inside the parental control television 430, the extra cost and inconvenience of a separate unit is avoided. The signal source input line 39 is connected to the parental control television 430 by a tamper proof connector 432 to prevent tampering. The cable box 43 and VCR 44 can be located outside of the parental control television 430. The parental control output on line 41 can be sent directly to the cable box 43, or can bypass the cable box 43 via line 444. The input selection switch 57 within the parental control television 430 selects either an input from VCR 44 or cable box 43 for viewing on television monitor 442. In this implementation, a normal tuner 438 and video circuits 440 are provided.

Another capability that can be provided within the parental control television 430 is the feature previously referred to as "V-Block," which allows the blocking of programs or scenes in programs that have objectional violence, nudity or language. V-block is implemented by including in the VBI of a program, a code indicating the presence of possibly objectionable matter and decoding the vertical blanking interval of a television raster scan to retrieve the code for controlling the viewing on the television.

A scene V-Block indication 449 can be put into one of the vertical blanking intervals lines, as shown in FIG. 21, which is described below along with FIGS. 19 to 24. The vertical blanking lines are then decoded by vertical blanking interval decoder 437. If vertical blanking interval decoder 437 detects a scene V-block indication 449 in the vertical blanking interval lines, and if the V-block mode has been enabled by parental control circuitry 40 via line 441, then the vertical blanking interval decoder 437 will open the V-block switch 439. This will block the offending scene from the television monitor 442. After the offending scene is finished, the vertical blanking internal decoder 437 detects the absence of scene V-block indication 449 in the vertical blanking interval lines and closes the V-Block switch 439, which reconnects the television monitor 442 to the video circuits 440. If all the scenes in a program have scene V-block indications, then the entire program is blocked.

The V-Block feature will also operate to block offending scenes from any programs played on the VCR which have a scene V-Block indication in the vertical blanking interval. This provides parental control for programs that are recorded with a scene V-block indication.

The V-Block approach does not provide for control by rating levels, such as PG-13, R, X etc. Control by rating level is desirable to give the parent or viewer the ability to select by level rather than on or off approach as provided by V-block.

To provide control of reception of portions of a program, be it a radio broadcast or a television broadcast, for example, data packets indicative of a particular rating level is associated with a program segment and is transmitted with the segment. The segment may be as short as one scene in a movie or television program or longer. Each segment that has a rating level lower than a standard level, such as G (general audience) for movies may be rated and a data packet included at the beginning of the segment.

The user of the receiver enters a rating level in apparatus at the receiving end, such as PG-13, and thereafter all segments rated lower than PG-13, such as R and X, will be blocked. This rating level approach is also applicable to taped programs.

The insertion of data packets in the VBI and the retrieval of and use thereof is described in greater detail in application Ser. No. 08/176,852 filed Dec. 29, 1993 which is incorporated herein by this reference as though set forth in full.

The following describes the vertical blanking interval and how it can be used for data.

Video images in a cathode ray tube (CRT) type-video device, e.g. television, are generated by scanning a beam along a predefined pattern of lines across a screen. Each time all the lines are scanned, a frame is said to have been produced. In one implementation, such as used in the United States, a frame is scanned 30 times per second. Each television frame comprises 525 lines which are divided into two separate fields, referred to as field 1 ("odd field") and field 2 ("even field"), of 262.5 lines each. Accordingly, these even and odd fields are transmitted alternately at 60 Hz. The lines of the even and odd fields are interleaved to produce the full 525 line frame once every 1/30 of a second in a process known as interlacing. Another standard in the world uses 625 lines of information and interlace 312 and 313 lines at 50 fields per second. In the 525 line standard used in the United States, approximately 480 lines are displayed on the television screen.

Referring now to the drawings, FIG. 19 is a schematic diagram illustrating the interlaced scanning pattern 600 on a screen of a conventional television receiver. A video display scans the beam from the top left hand corner and scans across the screen (line 22, field 1 in FIG. 19). After it finishes scanning the first line, the beam returns to the left hand side during a period known as a horizontal blanking interval and repeats scanning along another line which is parallel to but lower than the previous line (line 23, field 1 in FIG. 19). The scanning continues along the lines until the beam reaches the center of the bottom part of the screen (line 263, field 1) to complete field 1, which is comprised of lines 602.

From the bottom center of the screen, the beam returns to the top where it starts scanning from substantially the center of the screen along the lines 604 for field 2 which interlace the lines of field 1. This is not an instantaneous bottom to top jump but actually requires the length of time to scan 21 horizontal lines. These lines 606 are lines 1 through 21 of field 2. The second half of line 21 field two (line 284 as shown in FIG. 19) is displayed. Then lines 285 to 525 of field 2 are scanned to complete field 2. When the beam reaches the bottom, right hand corner of the screen, the picture frame is formed. Then the beam retraces to the top and the vertical blanking interval lines 608 are numbered 1 through 21 of field 1. In the NTSC protocol widely used in North America, each field contains 262.5 horizontal lines and a pair of fields constitute a single 525 line video frame and creates one video picture at one instant in time on the video display.

During the time in which the beam returns from the bottom to the top of the screen between the fields, it carries no video or picture signals because it does not produce any picture element on the screen. This time interval is generally known as the vertical blanking interval (VBI). Its duration is typically 21 times the time duration that it takes the beam to scan across the screen. In other words, the duration of the VBI is equal to the time for the beam to scan 21 lines and is divided into 21 lines. In interlaced scanning, the VBI is identified by the field with which it is associated. Apparatus and methods using the NTSC standard with 21 lines in each VBI are well known in the art and therefore are not discussed in detail herein.

Because no image is produced on the display during the vertical blanking interval, no picture information therefore needs to be carried by the broadcast signals. Thus, the VBI is used for conveying auxiliary information from a television network or station to an audience. For example, closed caption data associated with the television program are transmitted as encoded composite data signals in VBI line 21, field 1 of the standard NTSC video signal, as shown in FIG. 21.

Lines 1 through 9 of the VBI of each field are used for vertical synchronization and post equalizing pulses. Thus, lines 10 through 21 are available for auxiliary information.

Figure 20:
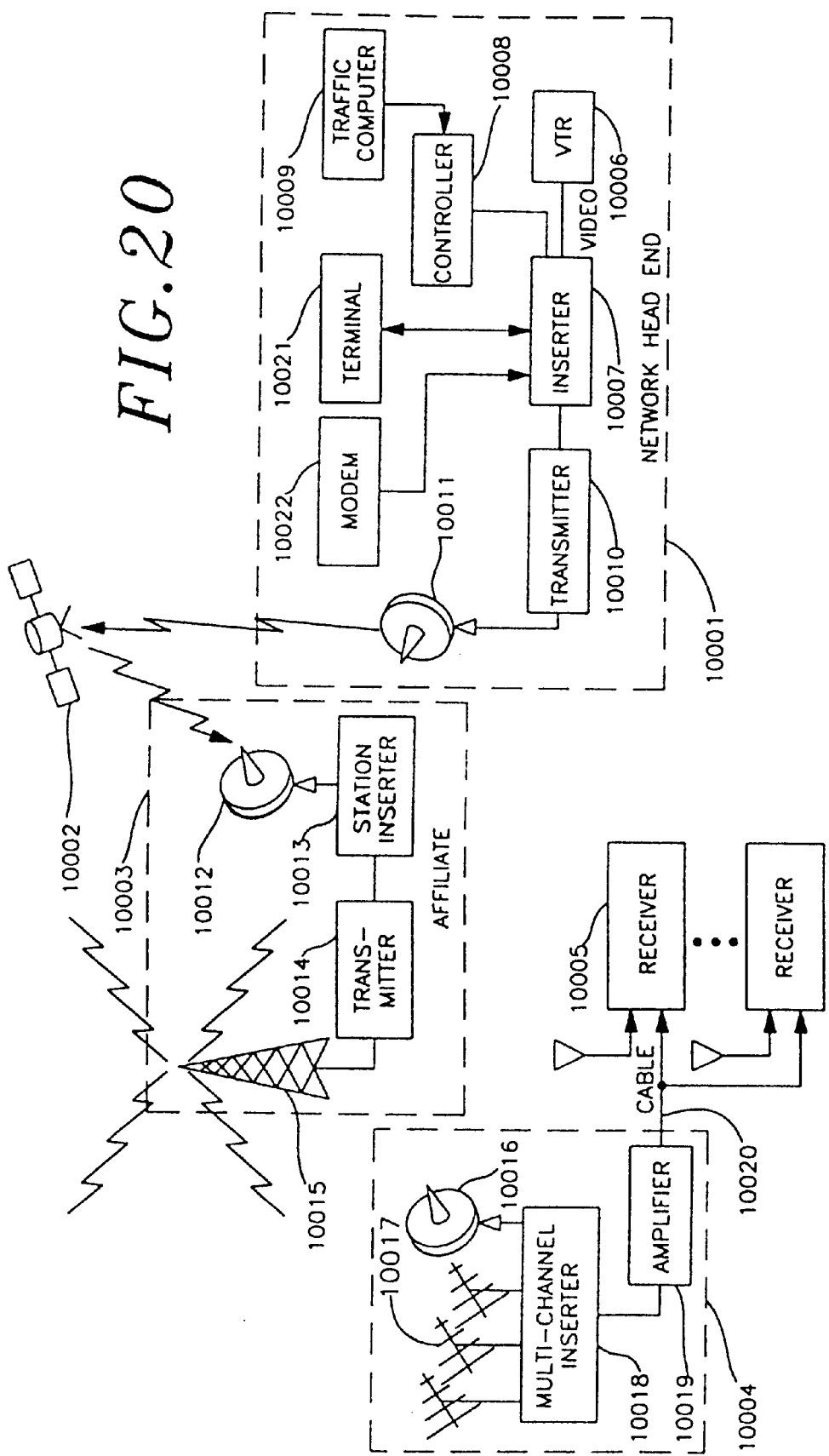
FIG. 20 is a functional block diagram of a television video and data transmission system.

FIG. 20 is a functional block diagram of a data transmission system. As used herein, the terms "broadcast" and "transmit" are used interchangeably for the transmission of signals over cable or fiber optics, to or from satellites, over the air, and the like. A network head end 10001 transmits a composite television signal containing inserted information in a portion thereof, typically the vertical blanking interval, to a satellite 10002 which rebroadcasts the same to a local affiliate 10003. The affiliate 10003 may further insert data into the vertical blanking interval of the received television signal and transmit the same to a local cable head end 10004. The cable head end 10004 receives television signals from a plurality of sources (including satellites) and may further insert data into the vertical blanking interval of any of the television signals. The signals from the plurality of sources are combined into a composite television signal, amplified, and provided over a cable to a plurality of individual receivers 10005, which can include televisions, cable boxes, VCRs and satellite receivers. In addition, the individual receivers 10005 may receive signals directly from the local affiliate 10003 by air, which may include the use of a satellite 10002, or by cable.

More specifically, the network head end has a video tape recorder (VTR) 10006 for providing a program signal to an inserter 10007. A controller 10008 also at the head end controls the scheduling of loading tapes from a cart (a machine with a plurality of video tape cassettes which are moved by a robotic arm from a storage location and inserted into a video tape recorder and vice versa). Furthermore, the controller 10008 controls the lighting of stages during live broadcasts, such as news broadcasts. The controller 10008 is typically a microprocessor based system. A traffic computer 10009 controls the exact timing of playing individual segments of video tapes and inserting commercials therebetween as well as switching between different programs. Some network head ends have both a traffic computer 10009 and a controller 10008. The controller 10008 provides data and commands to the inserter 10007. The traffic computer 10009 provides data and commands to the controller if present. Otherwise, the traffic computer 10009 provides these signals directly to the inserter 10007. The inserter 10007 inserts data into the vertical blanking interval of the composite television signal, as will be described below, and provides the television signal to a transmitter 10010 which in turn provides the television signal on a microwave carrier to a satellite dish 10011 for transmission to the satellite 10002.

The satellite 10002 retransmits the received signal, which is received by a satellite dish 10012 at the affiliate 10003. The dish provides the signal to a station inserter 10013 at the local affiliate 10003. The affiliate may also insert data into the composite television signal as will be described below. The television signal is then provided to a transmitter 10014 and then to a transmitting antenna 10015.

A local cable operator 10004 has a plurality of satellite dishes 10016 and antennas 10017 for receiving signals from a plurality of networks 10001 and affiliates 10003. The received signal from each of the dishes 10016 and antennas 10017 is provided to a respective input of a multi-channel inserter 10018, which can input data into the vertical blanking interval of a received signal. The multi-channel output from the inserter 10018 is amplified in an amplifier 10019 and provided over a cable 10020 to individual receivers 10005. Alternately the receivers 10005 could receive broadcast information via antennas or satellite receivers.

Each receiver 10005 includes a VBI decoder, which can include a VBI slicer and closed caption decoder, that scans VBI lines 10–21 of both fields 1 and 2. In addition it is possible to use the first few visible lines in each video frame for VBI data, for example, lines 22–24. Lines 1 through 9 are typically used for vertical synchronization and equalization and, thus, are not used to transmit data. Closed captioning and text mode data are generally transmitted on VBI line 21, field 1 of the standard NTSC video signal, at a rate of 2 bytes for each VBI line 21, field 1, as shown by closed caption data 612 in FIG. 21. The text mode fields fill the entire screen with text. The default mode is an open ended mode in which the page is first filled up and then scrolled up. The individual recipient of such data has no control over the data. Extended data services (EDS) data can be transmitted on VBI line 21, field 2, as shown by EDS data 616 in FIG. 21, at a rate of 2 bytes per VBI line 21, field 2.

By way of background, the data in the vertical blanking interval can be described in terms of the wave form, its coding and the data packet. The closed caption data wave form has a clock run-in followed by a frame code, followed by the data. The coding of the data is non-return-to-zero (NRZ) 7 bit odd parity.

Under mandatory FCC requirements effective July 1993, color televisions having a size 13" and greater must provide a closed caption decoder. Caption data decoding is further described in the following specifications, which are hereby incorporated by reference herein: Title 47, Code of Federal Regulations, Part 15 as amended by GEN. Docket No. 91-1; FCC 91–119; "CLOSED CAPTION DECODER REQUIREMENTS FOR THE TELEVISION RECEIVERS"; Title 47, C.F.R., Part 73.682(a)(22), Caption Transmission format; Title 47, C.F.R. Part 73.699, figure 6; "TELEVISION SYNCHRONIZING WAVE FORM"; Title 47, C.F.R., Part 73.699, figure 16; "LINE 21, FIELD 1 DATA SIGNAL FORMAT"; and PBS Engineering Report No. E-7709-C, "TELEVISION CAPTIONING FOR THE DEAF: SIGNAL AND DISPLAY SPECIFICATIONS".

Under the extended data services (EDS) proposed in the Recommended Practice for Line 21 Data Service, Electronics Industries Association, EIA-608 (drafts Oct. 12, 1992 and Jun. 17, 1993) (hereinafter referred to as "EIA-608" standard"), the subject matter of which is incorporated herein by reference, additional data is provided in line 21, field 2 of the vertical blanking interval. This recommended practice includes two closed captioning fields, two text mode fields and the extended data services. The extended data includes, among other information, program name, program length, length into show, channel number, network affiliation, station call letters, UCT (universal coordinated time) time, time zone, and daylight savings time usage. Upstream at the network, the network inserts the program name, the length of the show, the length into the show, the network affiliation, and the UCT time. Downstream at the affiliate, the affiliate inserts the channel number, the time zone, the daylight savings time usage and program names. The network inserts the data that does not differ for different affiliates.

The data inserted into the television signal by the various inserters includes closed captioning data and EDS data. The inserted data can include rating data packets, such as PG start data and PG end data, and text 614, as shown in FIG. 21. As will be explained this data is inserted into a program video segment. The data can be inserted into either or both fields in any VBI line between 10 and 20. For example, the data can be inserted into line 20 of field 2, as shown by the data 614 in FIG. 21. The data may be inserted into the VBI at the closed caption rate (1X format) or at two times the closed caption rate (2X format), which is further explained below.

The data may be manually entered from a local terminal 10021. The local terminal 10021 may be used to pre-build, recall, or edit messages. The terminal 10021 typically includes a computer. In addition, a modem 10022 may be used to provide data to the inserter 10007. The data may be provided manually or automatically from remote sites, such as a television program guide publisher or the network head end. The output of the inserter 10007 is a composite television signal with the data inserted. This system processes both teletext data (which is not related to the program) and auxiliary information (which is related to the program).

The timing of video signals in NTSC format is well known in Ad the art. As described above, the vertical blanking interval is the time between the flyback from the bottom of the screen to the top of the screen. Although no video signal is displayed, the horizontal synchronization pulses are still provided during the VBI. The standard data transmission rate is defined in the EIA-608 standard.

As shown in FIG. 22*a*, the horizontal synchronization pulse 620 is followed by color burst signals 622. For closed caption and EDS data, a clock run-in cycle 624 follows the color burst which in turn is followed by a frame code 626. The clock run-in is "10101010101." The frame code is "01000011." Two data bytes 628 and 630 are transmitted in each VBI line. Each byte is 8 bits including a parity bit. This format is referred to as the standard data rate format (or 1X format). Each byte in the VBI line is arranged with the least significant byte first. The last bit is used as parity for error checking. Each byte of the transmitted data is parity checked upon receipt. The 1X format is the format used to transmit closed captions in VBI line 21 field 1, as shown by closed caption data 612 in FIG. 21. It is also the format used to transmit EDS data in VBI line 21 field 2, as shown by EDS data 616 in FIG. 21.

Figure 22B:
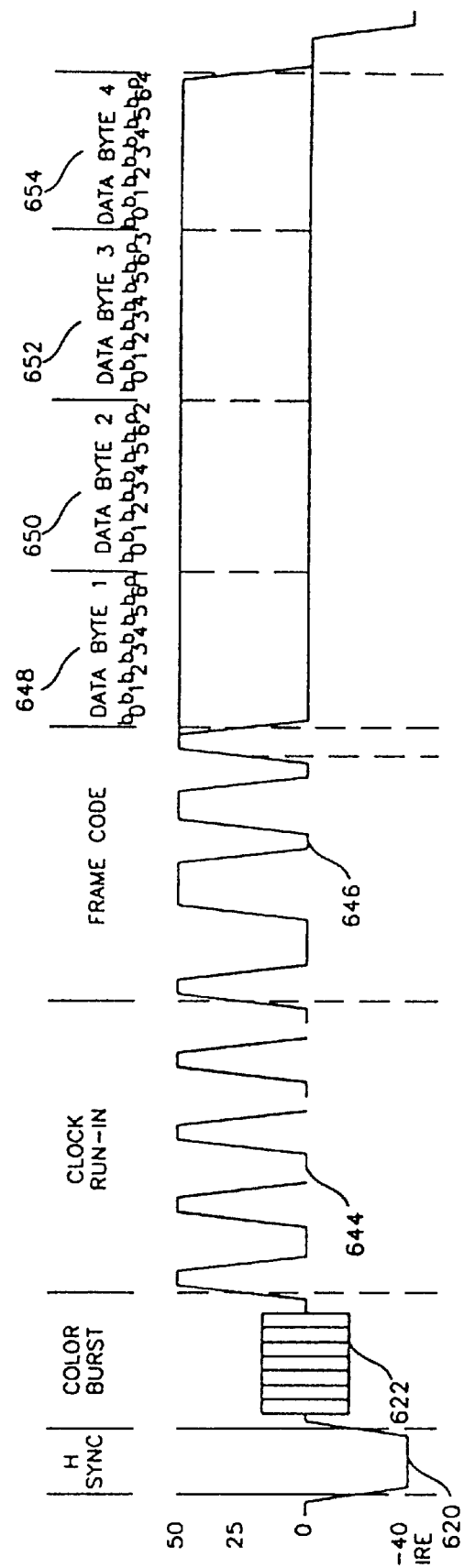
FIG. 22b is a timing diagram of the accelerated data format (2X) for transmitting data in the VBI.

An accelerated data format (2X format) as shown in FIG. 22*b* uses a bit rate twice that of the 1X format to thereby provide 4 bytes per VBI line. The clock run-in 644 is the bit sequence "10101010." The frame code 646 is "10011101101." Four data bytes 648, 650, 652 and 654 are transmitted each VBI line. The 2X format can be used to transmit data 614 in FIG. 21.

Figure 23:
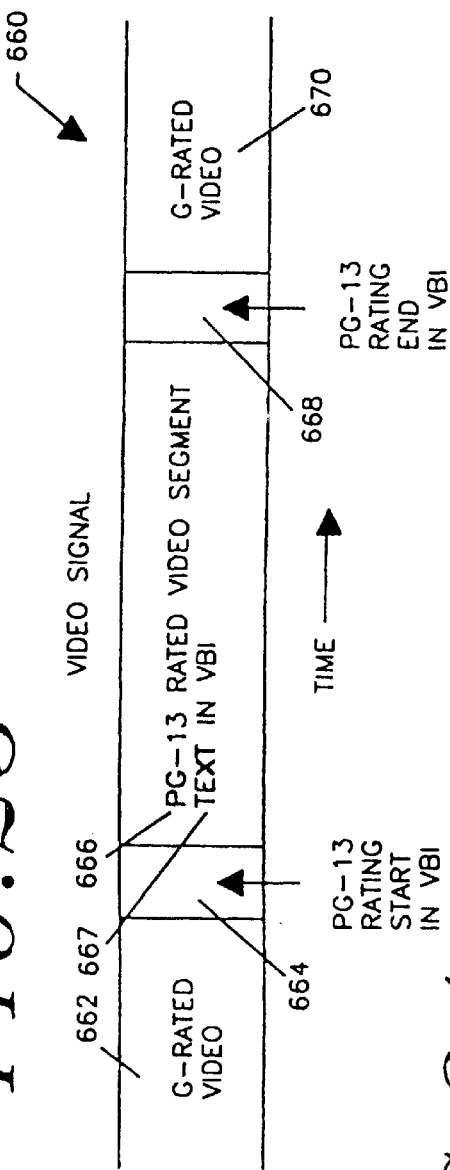
FIG. 23 is a time line showing a video signal in accordance with the present invention having a program video segment including rating data and text data.

FIG. 23 is an illustration of a video signal having rating data incorporated into the video signal 660 to allowing rating level control of the viewing of a program. In FIG. 23 it is shown that G-rated video 662 is being received and then at a later time a PG-13 rating start data 664 is embedded in the vertical blanking interval. The PG-13 rating start data 664 is followed by a PG-13 rated video 666, which is then followed by a PG-13 end data 668 which is embedded in the vertical blanking interval. After the PG-13 rating end data 668, a G-rated video 670 portion continues. When a program is transmitted, the inserters 10007, 10013, and 10018 shown in FIG. 20 can be used to insert the rating start signal data, rating end signal data, and text into the vertical blanking interval, as shown in FIG. 21. The PG-13 rating start data and PG-13 rating end data are used to mark the beginning of the PG-13 rated video segment and the end of the PG-13 rated video segment. The purpose of the inserted PG-13 rating start data, PG-13 rating end data and text in the vertical blanking interval, is to allow a user such as a parent, rating level control of the viewing of the program contained in the video signal.

Figure 25:
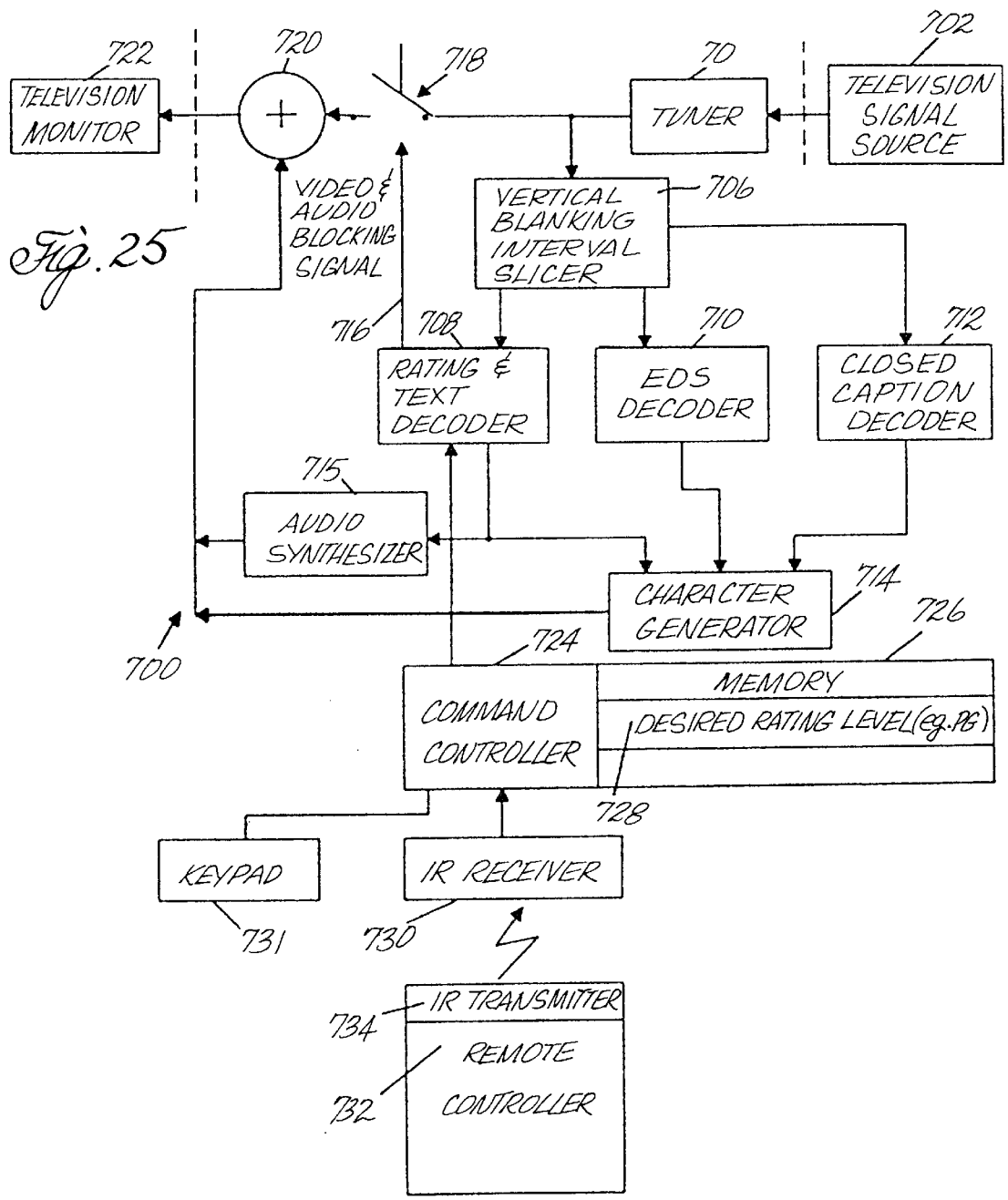
FIG. 25 is a schematic of an apparatus according to the present invention for providing rating level control of program viewing.

For example, suppose a parent has young children and wishes to show only a G-rated program or video to the children. The portion of the program that is G-rated including G-rated video 662 and G-rated video 670 would be displayed on a television in a normal manner. If apparatus is provided such as shown in FIG. 25, then the PG-13 rating start data is extracted from the vertical blanking interval and used to block the following PG-13 rated video segment data 666 from the television monitor. During the time that the PG-13 rated video segments data 666 is being blocked from the television monitor, the text data 667 embedded in the vertical blanking interval is extracted from the vertical blanking interval. Also, throughout the time that the PG rated video segment data 666 is blocked from the television monitor, the television screen is switched to a blue screen. On the blue screen the text data 667 is displayed. The text contains the description of what is happening in the plot during that PG-13 rated video segment in a nonviolent style. For example, a bloody fight might be blocked and then the text of FIGS. 32*a* to 32*d* displayed. The text data 667 remains on the television monitor until the PG-13 rating end data 668 data is extracted from the vertical blanking interval. Then the G-rated video 670 appears on the television screen.

In another embodiment the text that is extracted from the vertical blanking interval is sent to an audio synthesizer which is used to voice the text data. This is especially useful for children who cannot yet read.

Figure 24:
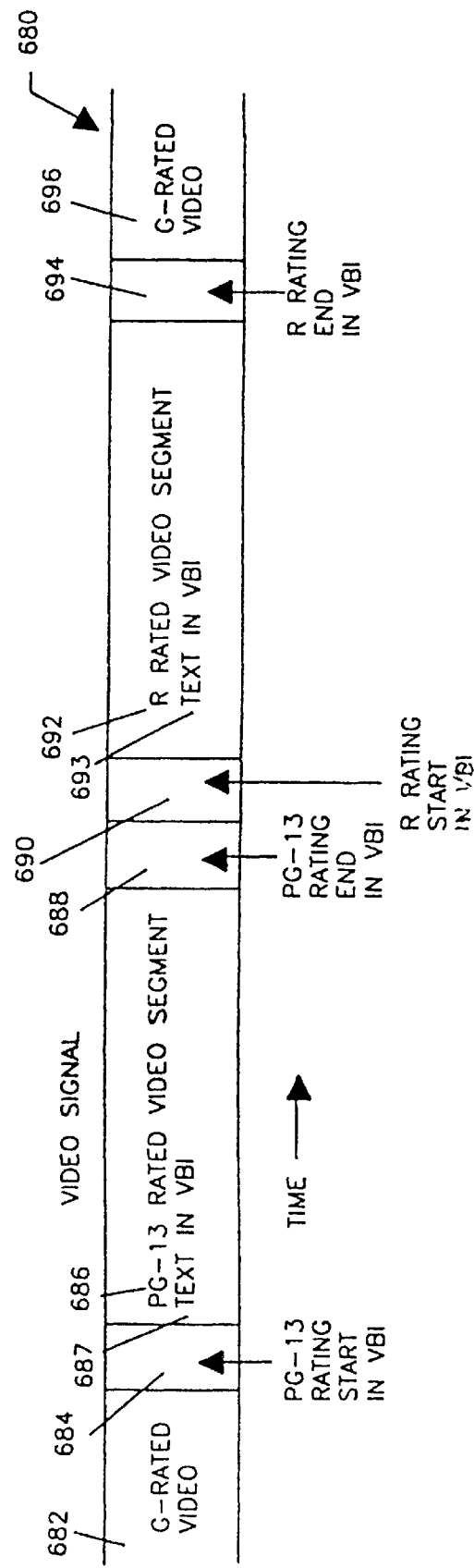
FIG. 24 is another time line of a video signal according to the present invention having multiple video segments including rating data and text data.

FIG. 24 is another illustration of a video signal that contains data for allowing rating level control of television viewing. In sequence of time, G-rated video 682 is followed by PG-13 rating start 684, which in turn is followed by PG-13 rated video segment 686. At the end of the PG-13 rated video segment, PG-13 rating end data 688 occurs. Thereafter an R rated video segment 692, preceded by an R rating start data 690, which is embedded in the vertical blanking interval occurs. At the end of the R rated video segment 692 an R rating end data 694 is embedded in the vertical blanking interval. Following the G-rated video 696 portion continues. Text 687 and text 693 are embedded in the vertical blanking interval during the PG-13 rated video segment and the R rated video segment, respectively. Suppose the user wishes to allow viewing of PG-13 rated video. Then with apparatus, such as shown in FIG. 25 which is described below, the user can enter data for the desired rating level which in this case would be PG-13. Then the apparatus would play G rated video 682 and continue playing PG-13 rated video segment 686. When R rating start data 690 is detected the apparatus blocks the R rated video segment from the television screen and instead displays text 693 after it is extracted from the vertical blanking interval. When R rating end data 694 is detected, the display of G rated video 696 portion continues. This example illustrates that the apparatus does not always block a marked video segment. The blocking of a rated video segment depends on the desired rating level entered by the user.

FIG. 23 and FIG. 24 show video signals that can be transmitted on the air or by land based broadcast or satellite broadcast or over a cable, (including fiber optics).

FIG. 25 illustrates an apparatus for allowing rating level control of the viewing of a program. A television signal source 702 provides the video signal and can be an antenna for receiving over the air video signals or a cable for receiving cable television. A tuner 704 tunes the apparatus for receiving the video signal. A vertical blanking interval slicer 702 is coupled to the output of tuner 704 and has outputs to a rating and text decoder 708, EDS decoder 710, and closed-captioned decoder 712. The EDS decoder 710 and the closed captioned decode 712 are for decoding data sent via extended data services or closed captioned services, as described above. The rating and text decoder 708 has the purpose of extracting the rating data and the text data from the vertical blanking interval to allow rating level control of the viewing of a program. The rating data is decoded by the rating and text decoder 708 and is used to send a video blanking signal on line 716 to switch 718 under the control of command controller 724. The switch 718 decouples the output of tuner 704 from the television monitor 722 to preclude display of the relevant program segment. Text data in the vertical blanking interval, as described in connection with FIGS. 23 and 24, is decoded by rating and text decoder 708 and sent to character generator 714 and audio synthesizer 715. The output of character generator 714 and audio synthesizer 715 are sent to adder 720 which become the characters and the audio sent to the television monitor 722. A desired rating level is sent to the rating and text decoder 708 from command controller 724 which has a memory 726 which can store the entered desired rating level 728. The desired rating level can be entered either via keypad 731 or via remote controller 732. An IR transmitter 734 in the remote controller 732 communicates the desired rating levels to the command controller via IR receiver 730.

Figure 26:
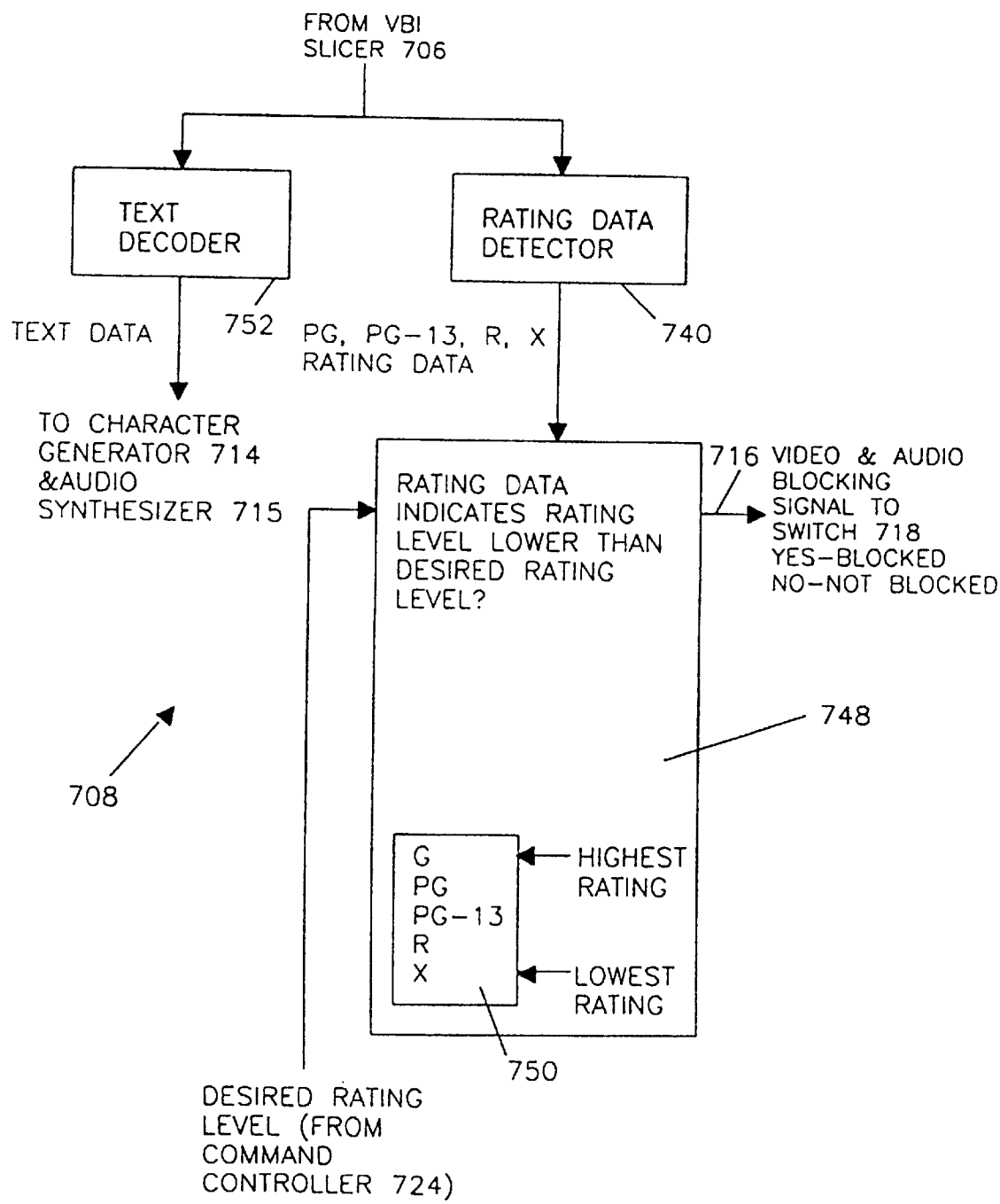
FIG. 26 is a schematic of the rating and text decoder shown in FIG. 25.

FIG. 26 is a more detailed schematic of rating and text decoder 708. The input from VBI slicer 706 is sent to text decoder 752 and rating data detector 740. The output of the text decoder 752 is the text data which is sent to character generator 714 and to audio synthesizer 715. The output of the rating data detector 740 consists of, for example, PG, PG-13, R, and X rating data. As shown in FIGS. 23 and 24 the rating data can be inserted at the beginning to mark the beginning of a rated video segment and at the end of a video segment to mark the end of the video segment. Alternatively, the rating data could be sent continuously or near continuously during the rated video segment and embedded in the vertical blanking interval to mark the video segment for control of viewing of the rated video segment.

The rating data from rating data detector 740 is sent to device 748. The device 748 has the purpose of determining from the extracted rating data and the entered desired rating level that is sent from the command controller 724, whether or not to block a received audio and video signal from a television monitor. The output of device 748 is sent to switch 718. One way of implementing device 748 is to provide a table 750 which ranks the order of the rating levels from the highest rating G to the lowest rating X. The rating hierarchy is G, PG, PG-13, R, and X. The user enters a desired rating level and the device 748 detects whether the rating data indicates a rating level that is lower then the desired rating level. For example, if the desired rating level is PG-13 and the rating data indicates a video segment that has a rating level of R then the video segment has a rating level that is lower than the desired rating level. Thus a video and audio blocking signal is sent on line 716 to switch 718 and opens switch 718 to block the video and audio of the program segment from the television monitor. If the desired rating level is PG-13 and the rating data indicates a rating level of PG, then because the rating data has a higher rating in table 750 than PG-13, the video and audio blocking signal does not open switch 718 and the video and audio signal is sent to the television monitor thereby allowing viewing of the PG material.

Figure 27:
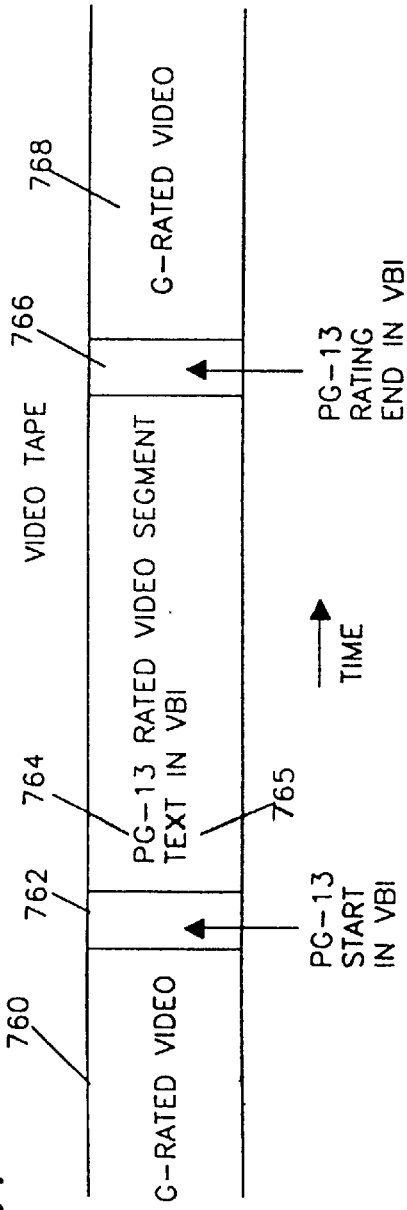
FIG. 27 is an illustration of a video tape layout according to the present invention having a video segment including rating data and text data.
Figure 28:
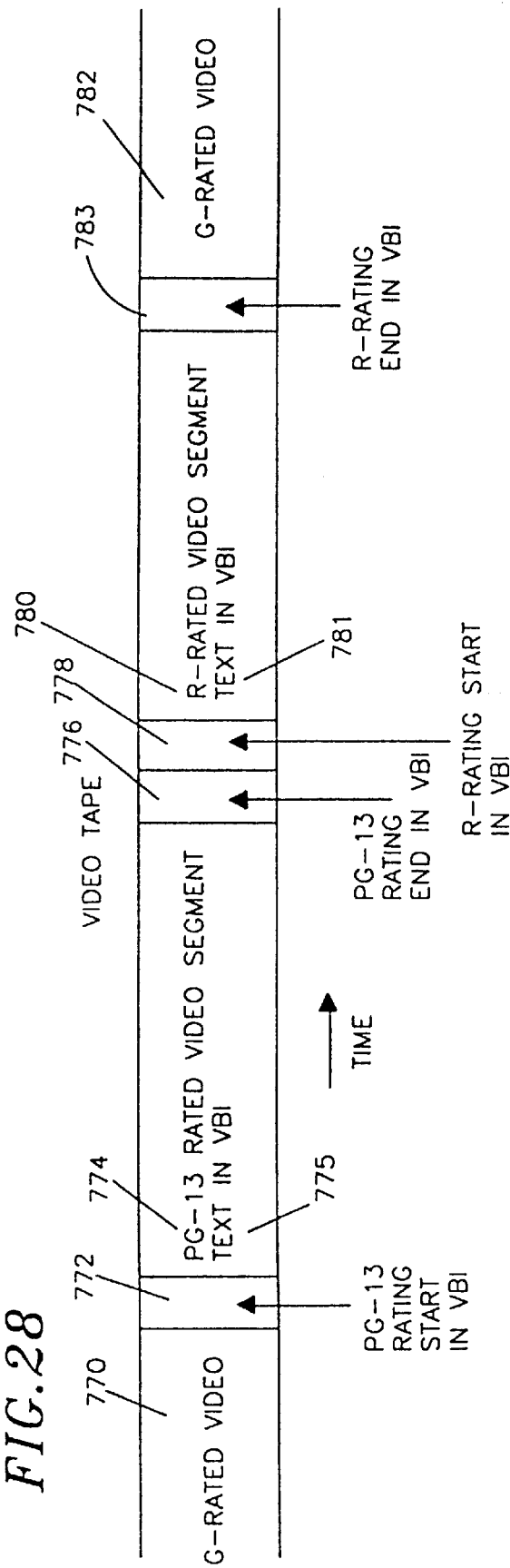
FIG. 28 is another illustration of a video tape layout according to the present invention having a video segment including rating data and text data.

Rather than transmit a video signal containing the rating data and text in the vertical blanking interval, a video tape can be provided that has the rating data and the text recorded onto the tape. For example, FIG. 27 shows a G rated video 760 at the start of the tape followed by a PG-13 start data 762 in the vertical blanking interval followed by a PG-13 rated video segment 764. Text data 765 is embedded in the vertical blanking interval during the PG-13 rated video segment 764. Then a PG-13 end data 766 is embedded in the vertical blanking interval followed by a G rated video segment 768. FIG. 28 shows a portion of a tape with two rated video segments, a PG-13 rated video segment and an R rated video segment 780. Each has a start and an end rating data (772, 776 and 778, 783, for example) embedded in the VBI and text in the VBI such as text 775 and 781. The portion shown in FIG. 28 starts with G rated video 770 and ends in G rated video 782.

Figure 29:
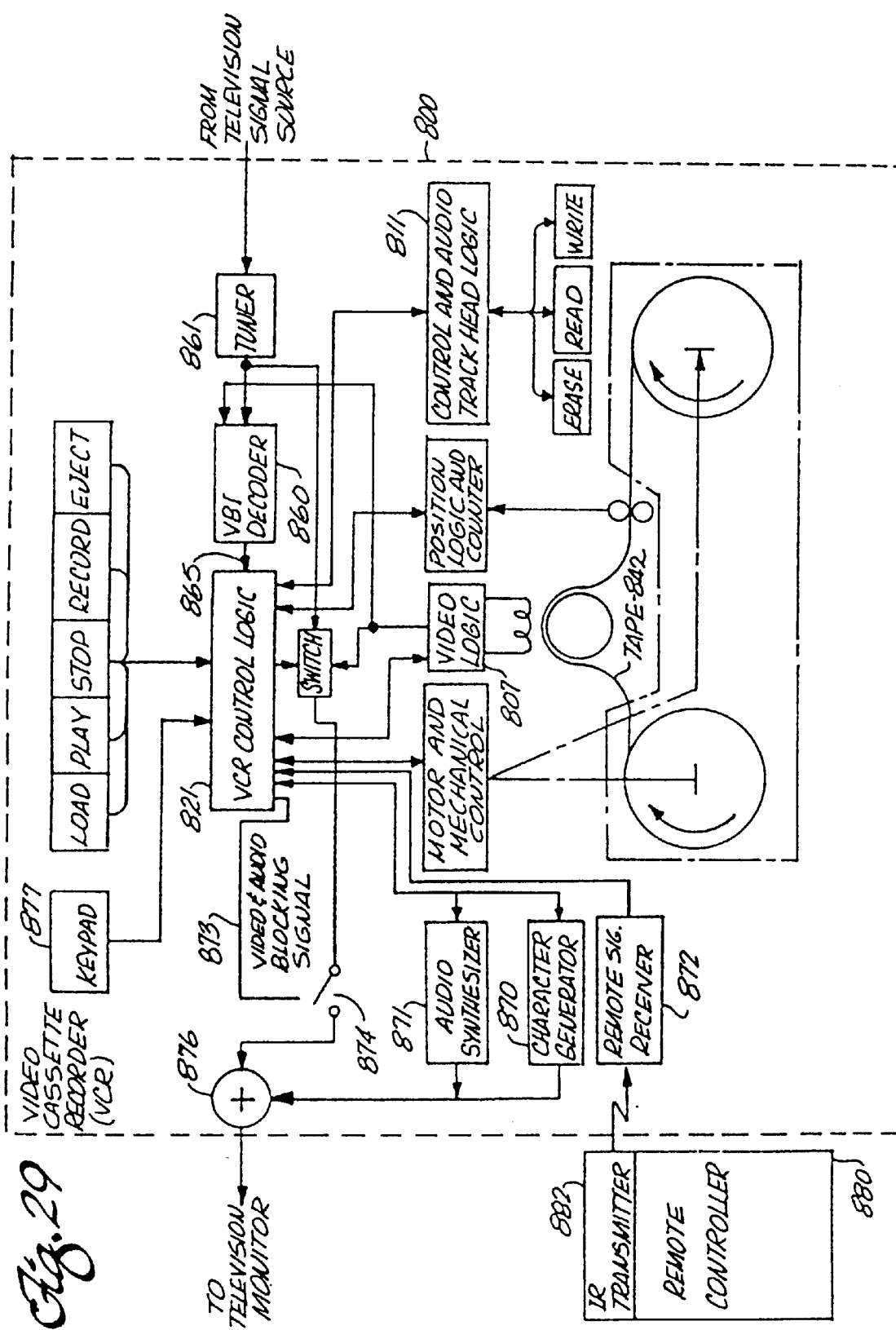
FIG. 29 is a schematic of a video cassette recorder according to the present invention that includes apparatus for allowing rating level control of program viewing.

A tape that is recorded in the manner shown in FIGS. 27 and 28 can be played on a video cassette recorder such as video cassette recorder 800 shown in FIG. 29. The VCR 800 which is similar to the VCR disclosed in FIG. 1 of the above referenced application Ser. No. 08/176,852, contains a vertical blanking interval decoder 860 that decodes the vertical blanking interval from video signals read from the tape 842 by video logic 807 or received from a television signal source through tuner 861. The VBI decoder 860 is coupled to VCR control logic 821. The VBI decoder 860 and the VCR control logic 821 perform the functions of vertical blanking interval slicer 706 and rating data and text data decoder 708 shown in FIG. 25. A video and audio blocking signal on line 873 controls switch 874 in the same manner as the video and audio blocking signal on line 716 controls switch 718. The VCR control logic decodes the text data and sends the text data to character generator 870 and audio synthesizer 871 which have outputs that communicate to adder 876 that inserts the characters or the voiced text from the audio synthesizer as the signal sent to the television monitor. A desired rating level can be entered via remote controller 880 via IR transmitter 882 and remote signal receiver 872. The desired rating level can also be entered via keypad 877 into VCR control logic 821 or by a similar keypad remote 880.

Alternatively, the VCR 800 can also contain a tuner 861 and can record or apply to the television monitor a program from a television signal source. The transmitted program can be recorded onto the tape 842 and then when the program is later played the feature of the VCR that allows rating level control of the viewing of a program can be used. The operation of the feature for allowing rating control is the same for VCR 800 as for the apparatus described in FIG. 25.

Figure 30:
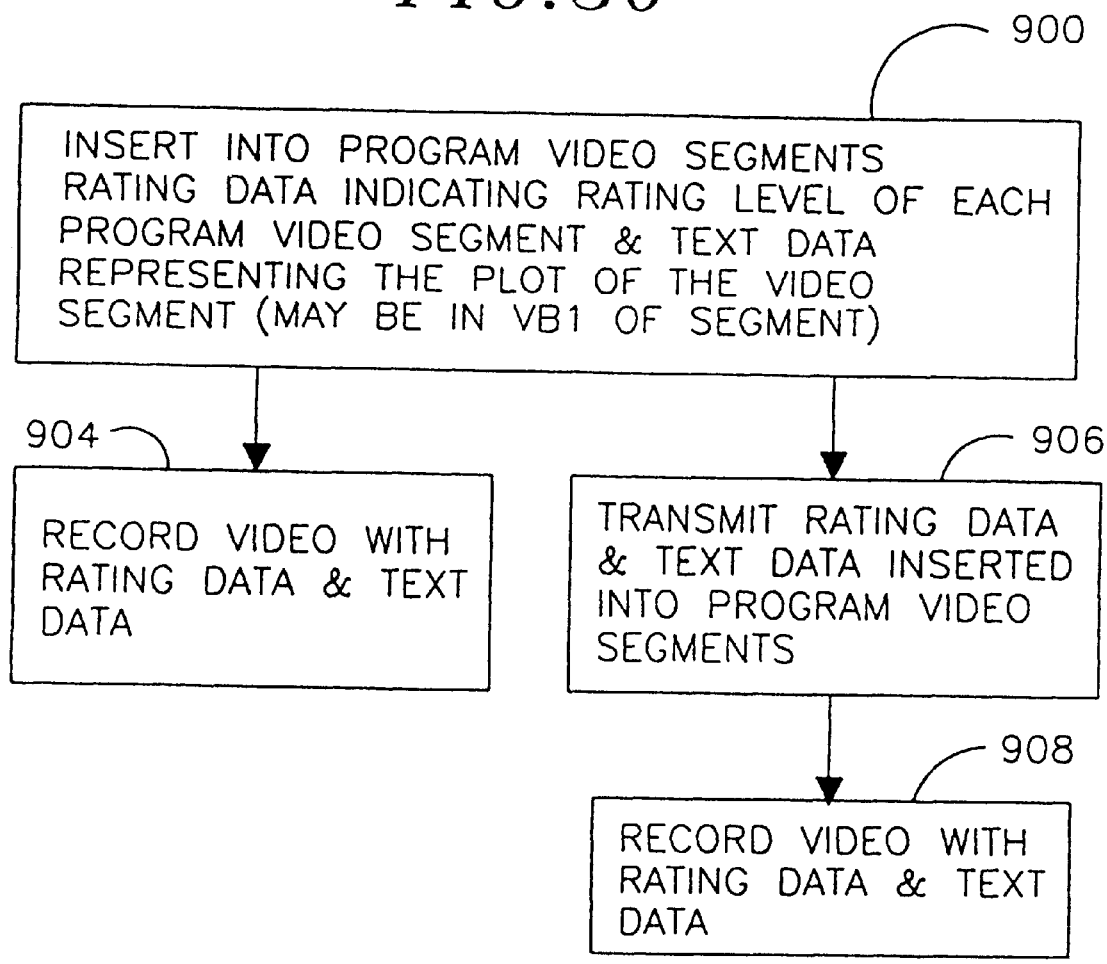
FIG. 30 is a flow diagram of a method for transmitting and recording a program to allow rating level control of viewing of the program according to the present invention.

FIG. 30 is a flow diagram for a method for allowing rating level control of the viewing of a program. In step 900 rating data indicating the rating level of each program video segment is inserted into the program video segments. Also text data representing the plot of the video segment is inserted into the program video segment. This text data is a "sanitized" verbal description of the action in the video segment on a scene by scene basis that enables the viewer to continue to follow the story line of the video program while it is blocked from the television monitor. Generally, the verbal description for each scene is a series of messages that describe the action in the same sequence in which it occurs in the scene. As a result, during the period that the program is blocked, the messages are changing, which heightens the interest of the viewer. The rating data and the text data can be inserted into the vertical blanking interval of the program video segments. In step 904 the video is recorded along with the rating data and the text data in the vertical blanking interval. In step 906 the video is transmitted along with the rating data and the text data inserted in the program video segments. Then in step 908 the transmitted video is recorded along with the rating data and the text data onto a tape.

Figure 31A:
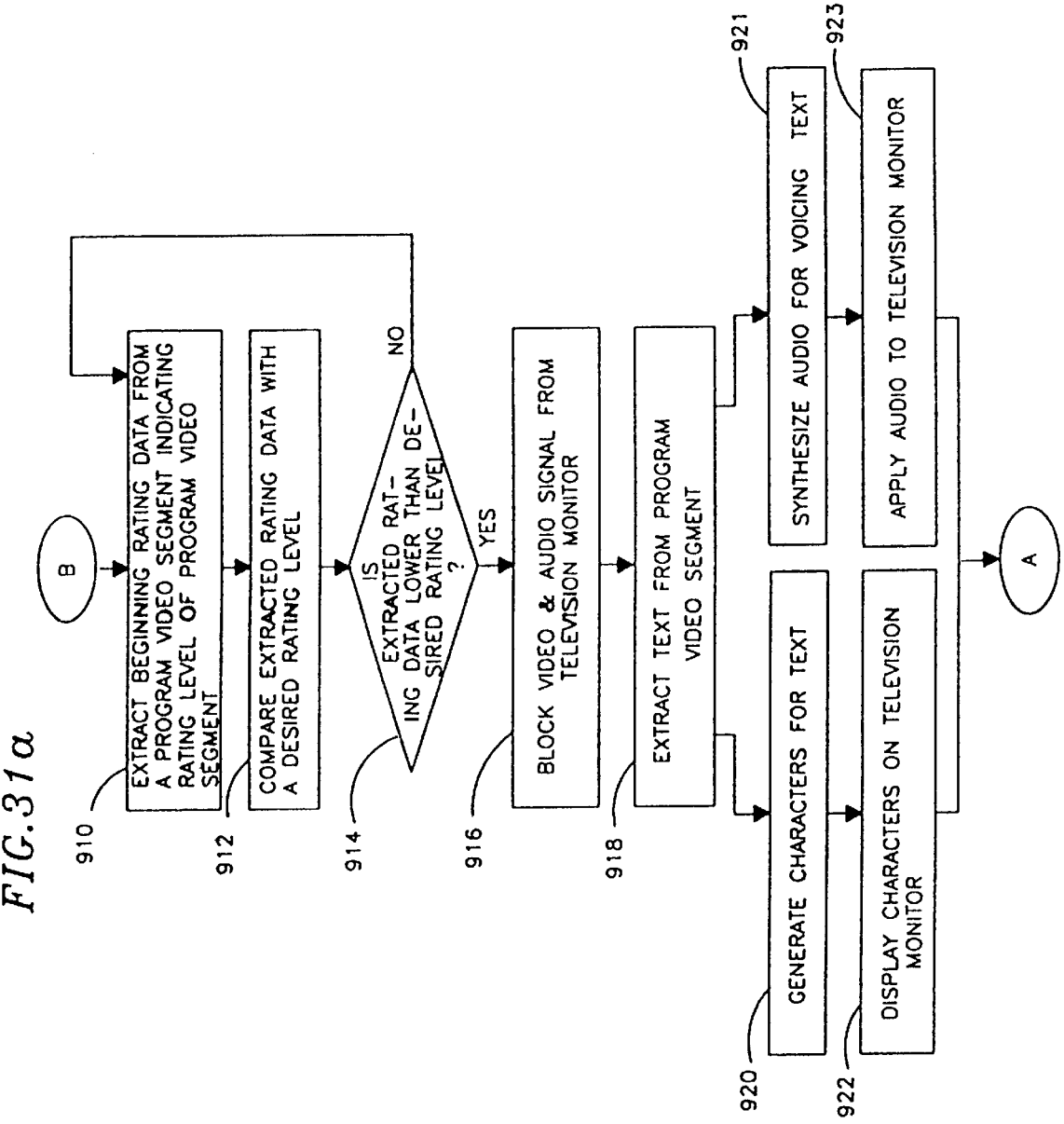
FIG. 31a and 31b are flow diagrams for a method for allowing rating level control of the viewing of a program according to the present invention.
Figure 31B:
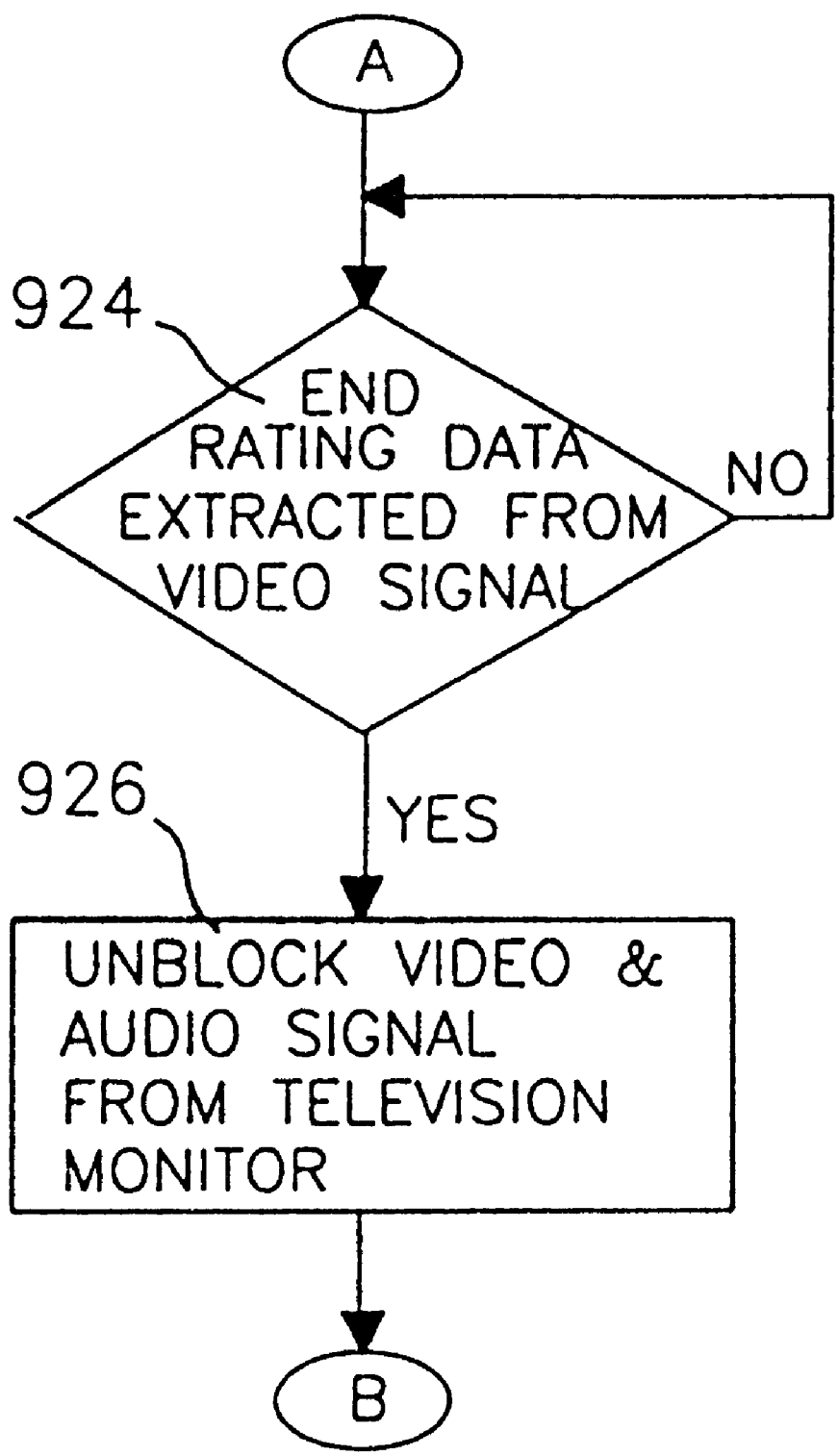
Figure 32A:
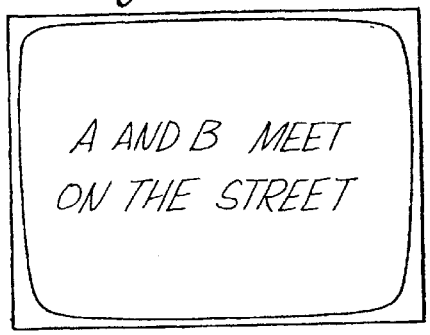
FIGS. 32a–32d illustrate the display of text data on a television monitor according to the present invention.
Figure 32B:
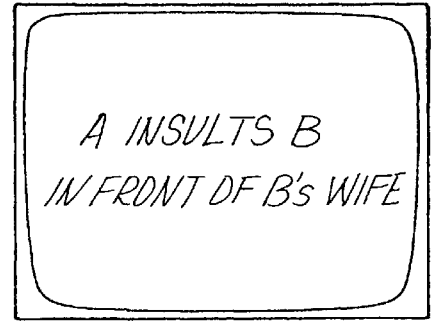
Figure 32C:
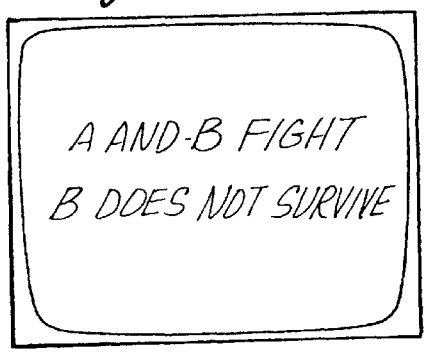
Figure 32D:
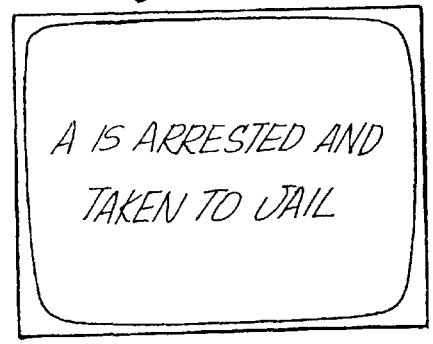

FIG. 31*a* and FIG. 31*b* are flow diagrams of a method for allowing rating level control of a program. In step 910 rating data is extracted from the beginning of a program video segment. The rating data indicates the rating level of the programmed video segment. In step 912 the extracted rating data is compared with a desired rating level. In step 914 it is determined whether the extracted rating data has a lower rating than the desired rating levels. If the rating data is equal to or higher than the desired rating level then the method returns to step 910. If the extracted rating data has a lower rating level than the desired rating level, then step 916 is performed. In step 916 the video and audio are blocked from the television monitor. Then in step 918 text data is extracted from the program video segment. The text data is used to generate characters for the text in step 920 and audio in step 921. In step 922 the characters are displayed on a television monitor. In step 921 audio is synthesized for voicing the text, and in step 923 the audio is applied to the television monitor. In step 924 (shown in FIG. 31*b*) it is determined whether an end rating data has been extracted from the video signal. If not, then the text displayed in step 922, and audio applied in step 923 continues. FIGS. 32*a* to 32*d* illustrate an example of a series of messages that are substituted for the blocked video program. If the end rating data is extracted from the video signal in step 924 then in step 926 the text and audio is discontinued and the video and audio signal of the programs are unblocked from the television monitor and the program is again available for viewing.

The described embodiments of the invention are only considered to be preferred and illustrative of the inventive concept, the scope of the invention is not to be restricted to such embodiments. Various and numerous other arrangements may be devised by one skilled in the art without departing from the spirit and scope of this invention.

It is therefore intended by the appended claims to cover any and all such applications, modifications and embodiments within the scope of the present invention.

I claim:

1. An apparatus for exercising parental control over a television receiver comprising:
    means for receiving a television signal containing a plurality of video scenes and textual data describing story lines of the respective video scenes;
    means for separating the textual data from the video scenes;
    a display monitor;
    means for displaying the video scenes on the monitor;
    a user input device; and
    means responsive to the user input device for sequentially displaying the textual data describing the story lines on the monitor as a plurality of separate screens instead of the respective video scenes to apprise a user of the story lines of the video scenes.

2. A method for displaying on a monitor a textual description of user-blocked video scenes in a television program comprising the steps of:
    receiving a television signal including a plurality of video scenes and a textual description of a story line of the scenes, wherein each video scene is associated with a parental control rating;
    separating the parental control rating from a respective video scene;
    displaying a first video scene on the monitor if the associated parental control rating of the first video scene does not match a user-defined blocking criterion;
    blocking a second video scene from being displayed if the associated parental control rating of the second video scene matches the user-defined blocking criterion; and
    sequentially displaying the textual description of the story line of the blocked second video scene as a plurality of separate screens on the monitor instead of the blocked second video scene.

3. The method of claim 2, in which the parental control rating of a respective video scene is inserted in the television signal at the beginning and the end of the respective video scene.

4. The method of claim 2, in which the parental control rating of a respective video scene is embedded in a vertical blanking interval of the television signal to mark the respective video scene.

5. The method of claim 2, in which the blocking criterion is matched when the parental control rating of a video scene exceeds a desired user rating.

6. The method of claim 2 further comprising the step of synthesizing an audio signal from the textual data to voice the textual data.

7. The method of claim 2 further comprising the step of displaying a third video scene on the monitor if the associated parental control rating of the third video scene does not match the user-defined blocking criterion.

8. An apparatus for exercising access control over a video scene of a television program comprising:
    a tuner for receiving a television signal including a plurality of video scenes and a textual description of a story line of the scenes, wherein each video scene is associated with a parental control rating;
    a decoder for separating the parental control rating from a respective video scene;
    a display monitor;
    means for displaying a first video scene on the monitor if the associated parental control rating of the first video scene does not match a user-defined blocking criterion;
    means for blocking a second video scene from being displayed if the associated parental control rating of the second video scene matches the user-defined blocking criterion; and
    means for sequentially displaying the textual description of the story line of the blocked second video scene as a plurality of separate screens on the monitor instead of the blocked second video scene.

9. The apparatus of claim 8 further comprising a synthesizer to provide an audio signal from the textual data to voice the textual data.

10. A method for exercising access control over a video scene of a television program comprising the steps of:
    telecasting a television signal including a plurality of video scenes and a textual description of a story line of the scenes, wherein each video scene is associated with a parental control rating;
    intercepting the television signal at a television receiver;
    displaying the video scenes included in the television signal at the receiver;
    blocking a video scene from being displayed if the associated parental control rating of the video scene matches a user-defined blocking criterion; and sequentially displaying the textual description of the story line of the blocked video scene as a plurality of separate screens on the monitor instead of the blocked video scene.

11. The method of claim 10 in which the parental control rating of a respective video scene is inserted in the television signal at the beginning and the end of the respective video scene.

12. The method of claim 10 in which the parental control rating of a respective video scene is embedded in a vertical blanking interval of the television signal to mark the respective video scene.

13. The method of claim 2, in which the textual description of the story line changes in a same sequence as the story line occurs in the blocked video scene.

14. The method of claim 2, in which the textual description of the story line is a series of changing messages displayed sequentially in different screens in a same sequence as the story line occurs in the blocked video scene.

15. The method of claim 2, in which the textual description of the story line changes while the parental control rating does not change.

16. The apparatus of claim 8, in which the textual description of the story line is a series of changing messages displayed sequentially in different screens in a same sequence as the story line occurs in the blocked video scene.

17. The apparatus of claim 8, in which the textual description of the story line changes while the parental control rating does not change.

* * * * *